(12) United States Patent
Konno et al.

(10) Patent No.: US 8,159,735 B2
(45) Date of Patent: Apr. 17, 2012

(54) LASER PROJECTOR

(75) Inventors: Kenji Konno, Sakai (JP); Keiko Yamada, Sakai (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 13/058,634

(22) PCT Filed: Aug. 19, 2009

(86) PCT No.: PCT/JP2009/064481
§ 371 (c)(1), (2), (4) Date: Feb. 11, 2011

(87) PCT Pub. No.: WO2010/021331
PCT Pub. Date: Feb. 25, 2010

(65) Prior Publication Data
US 2011/0134499 A1 Jun. 9, 2011

(30) Foreign Application Priority Data
Aug. 21, 2008 (JP) .................................. 2008-212497

(51) Int. Cl.
*G02B 26/08* (2006.01)
(52) U.S. Cl. ........................................ 359/202.1; 353/70
(58) Field of Classification Search ............... 359/202.1; 353/70, 98–99
See application file for complete search history.

(56) References Cited

U.S. PATENT DOCUMENTS

| 5,130,838 A * | 7/1992 | Tanaka et al. ............... 359/200.1 |
| 7,385,745 B2 * | 6/2008 | Ishihara ...................... 359/202.1 |
| 2004/0080799 A1 | 4/2004 | Ishihara ......................... 359/202 |
| 2008/0037090 A1 | 2/2008 | Miller et al. ................... 359/212 |

FOREIGN PATENT DOCUMENTS

| JP | 2000-352678 A | 12/2000 |
| JP | 2004-138748 A | 5/2004 |

* cited by examiner

*Primary Examiner* — James Phan
(74) *Attorney, Agent, or Firm* — Cozen O'Connor

(57) ABSTRACT

A two-dimensional image is displayed on a screen (SC) by scanning the screen (SC) two-dimensionally with light beams from a laser light source (1) that are deflected to orthogonally-intersecting first and second scanning directions by means of a mirror (10) in a deflection apparatus (3). The deflection apparatus (3) is arranged to incline obliquely in the second scanning direction (e.g. vertical direction) lower in a scanning speed than the first scanning direction (e.g. horizontal direction), and performs an oblique projection onto the screen (SC). Assuming a direction in which the incidence angle of a light beam deflected by the deflection apparatus (3) and entering the screen (SC) increases in the second scanning direction is positive side, the light beam from the laser light source (1) impinges on the deflection apparatus (3) from the negative side in the second scanning direction, and the normal to the mirror (10) in the deflection apparatus (3) in a state where the center of the screen is displayed inclines to the negative side in the second scanning direction with respect to the normal to the screen (SC).

10 Claims, 23 Drawing Sheets

FIG.2 ENLARGED VIEW (EMBODIMENT 1, EXAMPLE 1)

FIG.3 ENTIRE VIEW (EMBODIMENT 2, EXAMPLE 2)

FIG.5 ENTIRE VIEW (EMBODIMENT 3, EXAMPLE 3)

FIG.6 ENLARGED VIEW (EMBODIMENT 3, EXAMPLE 3)

FIG.7 ENTIRE VIEW (EMBODIMENT 4, EXAMPLE 4)

FIG.8 ENLARGED VIEW (EMBODIMENT 4, EXAMPLE 4)

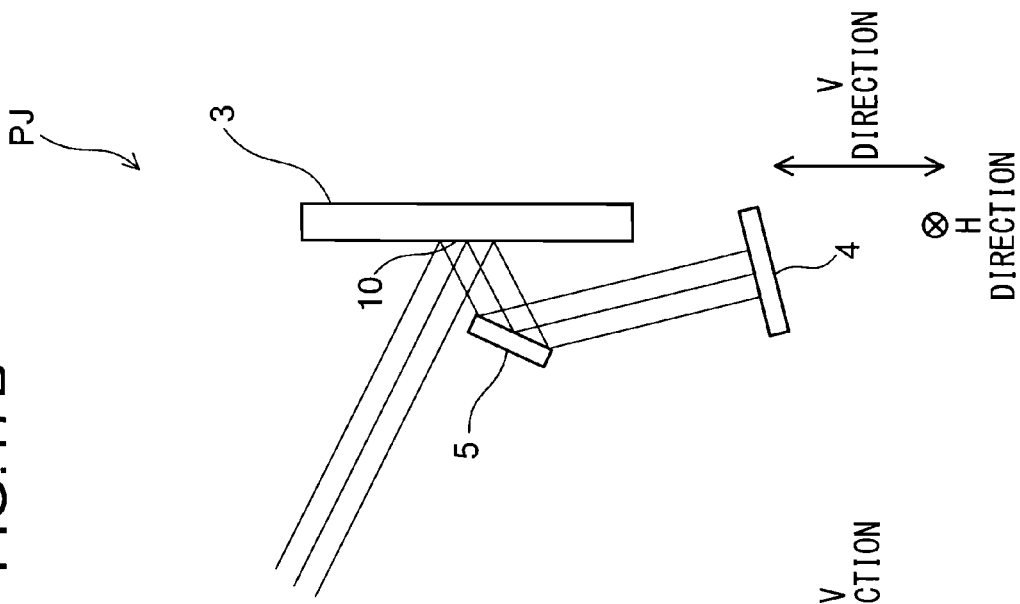
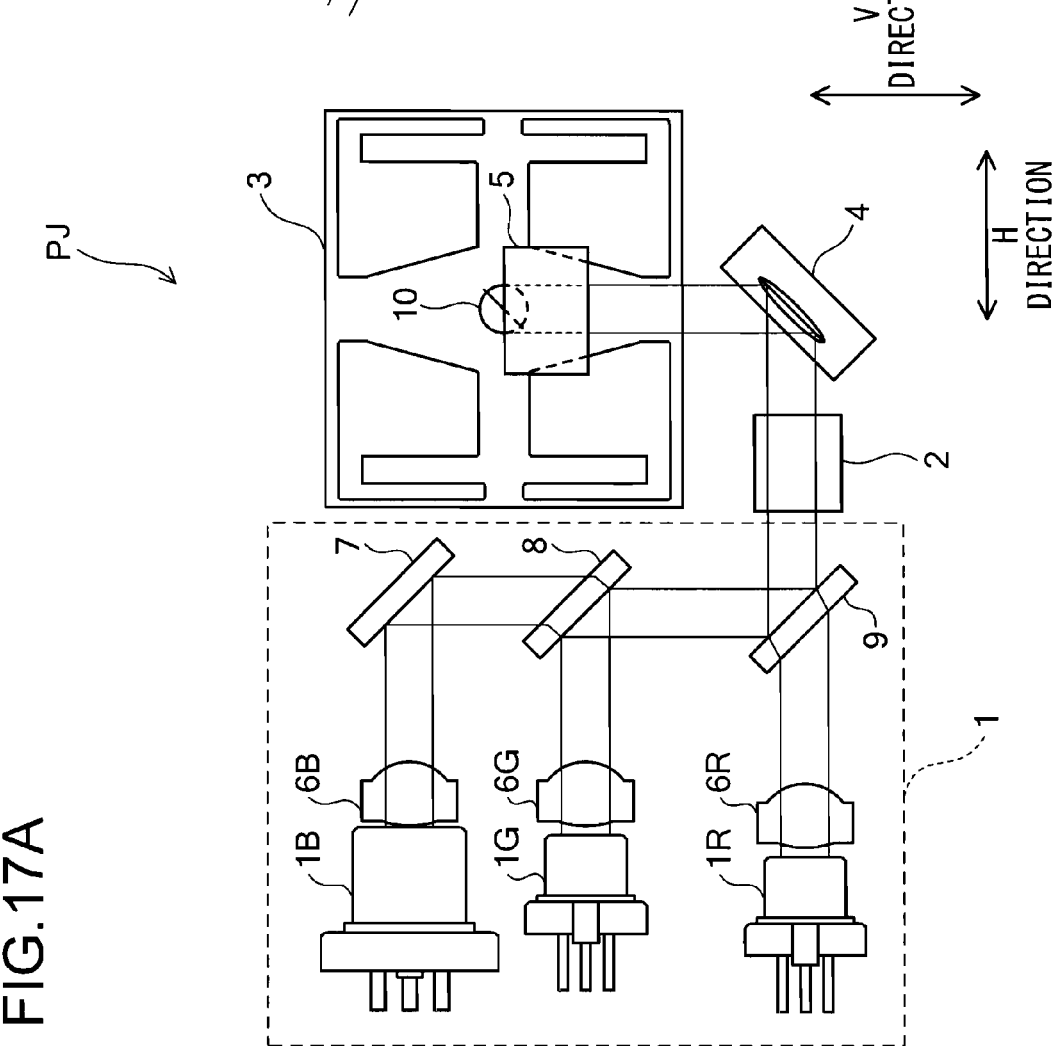
FIG. 17A
FIG. 17B

θ in = 20°

θ in = 25°

θ in = 35°

θ in = 40°

LASER PROJECTOR

RELATED APPLICATIONS

This application is a U.S. National Stage Application under 35 U.S.C. 371 of International Application No. PCT/JP2009/064481, filed with Japanese Patent Office on Aug. 19, 2009, which claims priority to Japanese Patent Application No. 2008-212497, filed Aug. 21, 2008.

TECHNICAL FIELD

The present invention relates to a laser projector that displays a two-dimensional image on a projection surface by two-dimensionally scanning the projection surface with laser light.

BACKGROUND ART

There have conventionally been proposed various laser projectors that use an MEMS (micro electro mechanical systems) mirror or the like as a deflection apparatus to two-dimensionally deflect laser light to two-dimensionally scan a projection surface therewith, to thereby display a two-dimensional image on the projection surface. Such laser projectors employ either a polarization separation method or an angular separation method as a method of separating light incident on the deflection apparatus and light reflected by the deflection apparatus from each other.

The polarization separation method makes use of polarization to separate incident light and reflected light from each other. For example, Patent Literature 1 listed below discloses a projector that employs the polarization separation method. With this projector, laser light (for example, S-polarized light) is reflected by a PBS to be converted to circular polarized light by a ¼ wave plate, and thereafter, the circular polarized light is made to be perpendicularly incident on an MEMS mirror, while reflected light projected perpendicularly from the MEMS mirror is converted to P-polarized light by the ¼ wave plate, and the P-polarized light is transmitted through the PBS to be perpendicularly projected onto a screen.

Such a polarization separation method, in which light from the MEMS mirror is perpendicularly projected onto the screen, is advantageous in that less trapezoidal distortion occurs in an image (projected image) displayed on the screen, but it suffers from the following disadvantage. That is, when the projector is placed on a desk or on a floor when it is in use, the lower half of the projected image is displayed on the desk or on the floor, and thus the projector needs to be held by hand to display (project) the image on the entire screen. Holding the projector by hand is not preferable, since the projector is liable to be shaken, and it is difficult to keep using the projector for a long time. If, to cope with these disadvantages, the projector itself is placed tilted on a desk while it is in use, then trapezoidal distortion occurs due to oblique projection. Also, in order to obtain a color image as a projected image, it is necessary to use light of red (R), green (G), and blue (B), but it is difficult to design the above-mentioned PBS and ¼ wave plate such that a preferable optical characteristic can be obtained with respect to light of each color of red (R), green (G), and blue (B). Thus, loss is liable to occur with respect to light having a wavelength different from a designed wavelength, and this makes it difficult to obtain a bright projected image.

On the other hand, the angular separation method is a method in which incident light and reflected light are separated from each other by making laser light incident on a deflection apparatus from an oblique direction. With the angular separation method, light reflected from the deflection apparatus is projected obliquely with respect to a screen, and thus, even when the projector is placed on a desk, it is possible to display an image over the entire screen. In addition, since optical members such as the above-described PBS and ¼ wave plate are not necessary, the method is free from the above-described disadvantageous loss of light amount. Therefore, it can be said that the angular separation method is superior to the polarization separation method in terms of usability of a projector and brightness of a projected image.

CITATION LIST

Patent Literature

Patent Literature 1: United States Patent Application Laid-Open No. 2008/0037090

SUMMARY OF INVENTION

Technical Problem

However, since light is projected obliquely with respect to a screen in the angular separation method, the method is always associated with risk of trapezoidal distortion of a projected image, and thus, trapezoidal distortion needs to be reduced somehow. In this respect, for example, a projection optical system may be arranged at a screen side of the deflection apparatus to correct trapezoidal distortion. The arrangement of the projection optical system at the screen side of the deflection apparatus, however, may obstruct achievement of thin projectors. Thus, in the structure where light is projected obliquely with respect to a screen, it is advisable that trapezoidal distortion be reduced without provision of a projection optical system.

The present invention has been made to solve the above problems, and an object thereof is to provide a thin laser projector structured to project light obliquely with respect to a projection surface, and capable of reducing trapezoidal distortion of a projected image without providing a projection optical system.

Solution to Problem

According to the present invention, a laser projector is provided with: a laser light source; and a deflection apparatus that deflects light from the laser light source by a reflection member in a first scanning direction and a second scanning direction that are orthogonal to each other, and that scans a projection surface two-dimensionally, the laser projector displaying a two-dimensional image on the projection surface by adjusting an output of the laser light source according to a deflection state of the deflection apparatus. Here, the deflection apparatus scans faster in a first scanning direction than in a second scanning direction, the deflection apparatus deflects light from the laser light source to thereby project light onto the projection surface obliquely in the second scanning direction. Here, also, assuming that a screen-center display state of the deflection apparatus is a deflection state in which a ray from the laser light source is deflected by the deflection apparatus to be incident on a center of the projection surface, and that a positive direction in the second scanning direction is a direction in which an incidence angle of a ray deflected by the deflection apparatus on the projection surface increases, light from the laser light source is incident on the deflection apparatus from a negative direction side in the second scanning direction, and a normal line of the reflection member of the deflection apparatus in the screen-center display state is tilted toward the negative direction side in the second scanning direction with respect to a normal line of the projection surface.

In the laser projector according to the present invention, it is advisable that the second scanning direction be a vertical direction.

It is advisable that the laser projector according to the present invention fulfill a conditional expression (1):

$$0.25 < \theta mems/\theta in < 0.75 \quad (1)$$

where $\theta mems$ is an angle formed by the normal line of the reflection member of the deflection apparatus in the screen-center display state and a normal line of the projection surface in the second scanning direction; and $\theta in$ is an incidence angle in the second scanning direction when a principal ray from the laser light source is incident on the reflection member of the deflection apparatus in the screen-center display state.

It is further advisable that the laser projector according to the present invention fulfill a conditional expression (1a):

$$0.3 < \theta mems/\theta in < 0.7 \quad (1a)$$

The laser projector according to the present invention may be structured such that a projection direction of light from the laser light source is orthogonal to the normal line of the reflection member of the deflection apparatus in the screen-center display state, the laser projector further including: an upward-reflection mirror reflecting light from the laser light source upward in a twisting direction; and a downward-reflection mirror reflecting light reflected upward from the upward-reflection mirror downward to the deflection apparatus.

In the laser projector according to the present invention, it is advisable that the deflection apparatus be driven by a piezoelectric driving method in which a voltage is applied to a piezoelectric element to rotate the reflection member to thereby deflect light from the laser light source that is incident on the reflection member.

It is advisable that the laser projector according to the present invention fulfill a conditional expression (2):

$$\theta in/\theta scan(V) > 1.5 \quad (2)$$

where $\theta in$ is an incidence angle in the second scanning direction when the principal ray from the laser light source is incident on the reflection member of the deflection apparatus in the screen-center display state; and $\theta scan(V)$ is a mechanical scanning angle in the second scanning direction from the screen-center display state of the deflection apparatus.

It is advisable that the laser projector according to the present invention fulfill a conditional expression (2a):

$$\theta in/\theta scan(V) > 2 \quad (2a)$$

It is advisable that the laser projector according to the present invention fulfill a conditional expression (3):

$$\theta in \leq 35° \quad (3)$$

It is advisable that the laser projector according to the present invention fulfill a conditional expression (4):

$$1.1 < \cos(\theta in) \times \theta scan(H)/\theta scan(V) < 1.5 \quad (4)$$

where $\theta in$ is an incidence angle in the second scanning direction when the principal ray from the laser light source is incident on the reflection member of the deflection apparatus in the screen-center display state;

$\theta scan(H)$ is a mechanical scanning angle in the first scanning direction from the screen-center display state of the deflection apparatus; and $\theta scan(V)$ is a mechanical scanning angle in the second scanning direction from the screen-center display state of the deflection apparatus.

Advantageous Effects of Invention

According to the present invention, light from the laser light source is reflected by the reflection member of the deflection apparatus (for example, an MEMS mirror) to be deflected in the first scanning direction (for example, the horizontal direction) and the second scanning direction (for example, the vertical direction), to be led to the projection surface. Here, the scanning speed of the deflection apparatus is faster in the first scanning direction than in the second scanning direction, and this results from sinusoidally driving the deflection apparatus in the first direction and linearly driving the deflection apparatus in the second direction. By adjusting the output of the laser light source according to the deflection state of the deflection apparatus while two-dimensionally scanning the projection surface by the deflection apparatus, a two-dimensional image is displayed on the projection surface.

Here, light from the laser light source is incident on the deflection apparatus from a negative direction side in the second scanning direction, and the deflection apparatus deflects the light, to thereby perform, in the second scanning direction, oblique projection onto the projection surface. Generally, trapezoidal distortion of a projected image (projected image area) is liable to occur with an oblique projection structure, but in contrast, with the structure of the present invention, since the normal line of the reflection member of the deflection apparatus in the screen-center display state is tilted toward the negative direction side in the second scanning direction with respect to the normal line of the projection surface, the degree of oblique projection onto the projection surface can be reduced. This makes it possible to reduce trapezoidal distortion without arranging a projection optical system for correcting trapezoidal distortion. As a result, a thin device can be achieved in which trapezoid distortion is reduced without arranging a projection optical system from the deflection apparatus to the projection surface.

BRIEF DESCRIPTION OF DRAWINGS

FIG. 17 is a diagram where (a) is a front view showing the structure of a laser projector of a modified example of Embodiment 4, and (b) is a side view of the above laser projector;

DESCRIPTION OF EMBODIMENTS

Hereinafter, embodiments of the present invention will be described with reference to the relevant drawings. For convenience of description, it is assumed in the following descriptions that the long-side direction of a projection surface is an H direction (horizontal direction), and the short-side direction thereof is a V direction (perpendicular direction, vertical direction). Here, it is assumed that the projection surface is a screen, but it may be a wall.

1. Structure of Laser Projector

Figure 1:
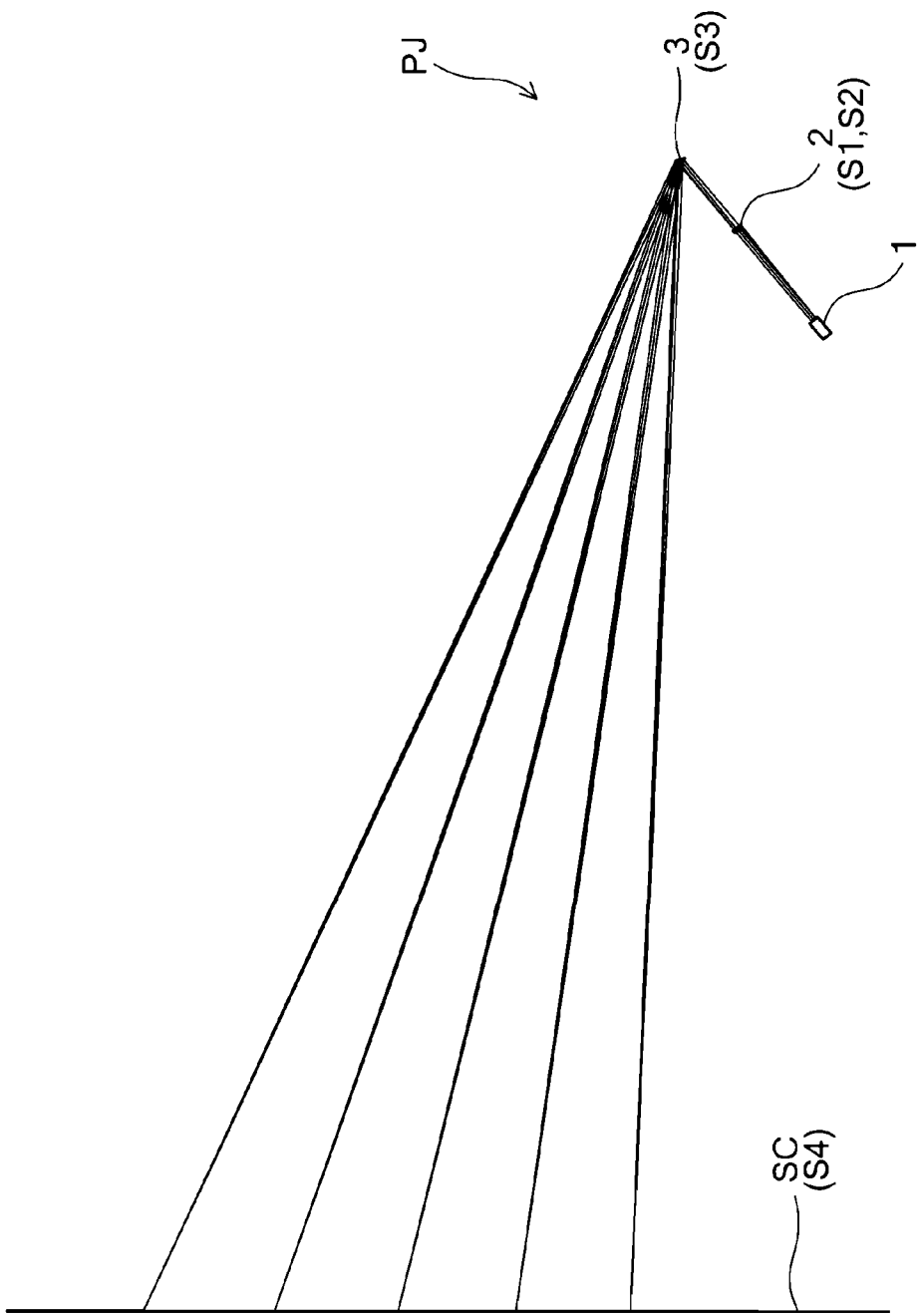
FIG. 1 is a vertical sectional view showing the overall structure of a laser projector according to Embodiment 1 of the present invention.
Figure 2:
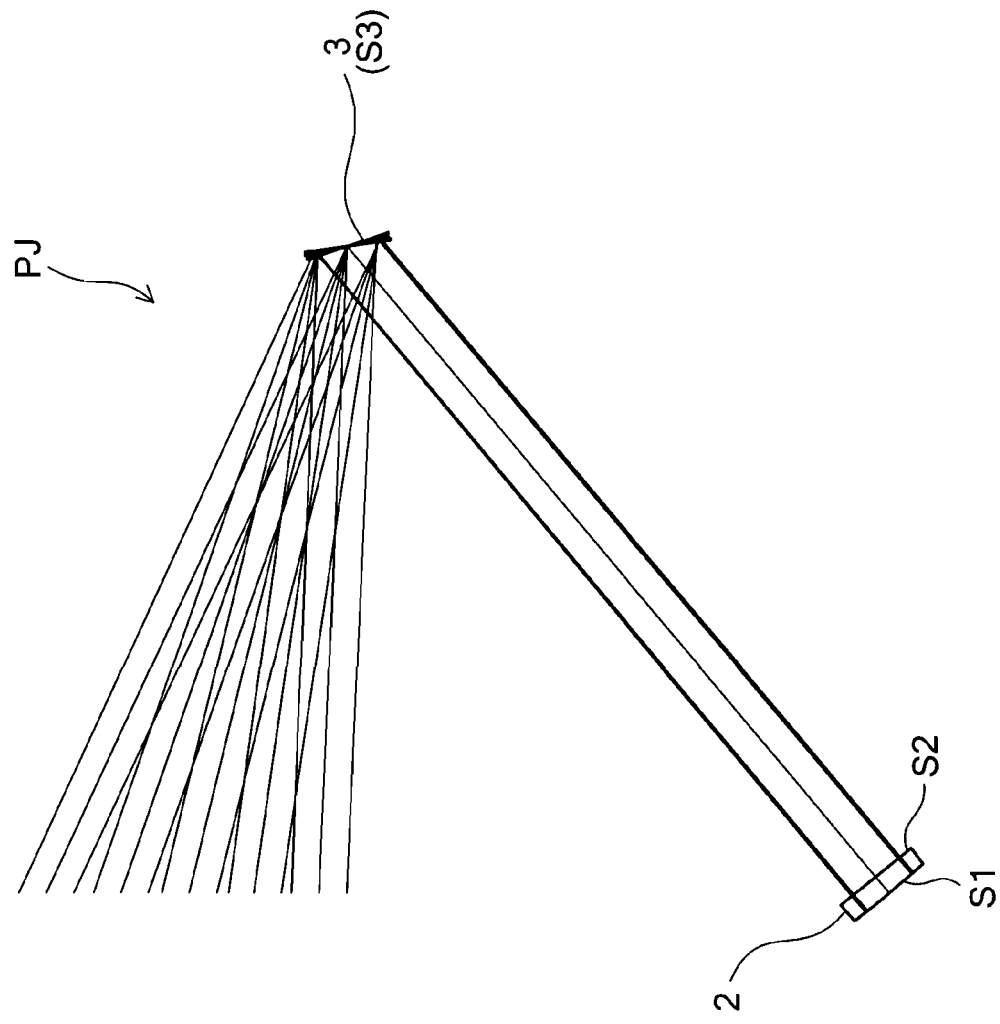
FIG. 2 is a vertical sectional view showing in an enlarged manner a principal part of the above laser projector.
Figure 3:
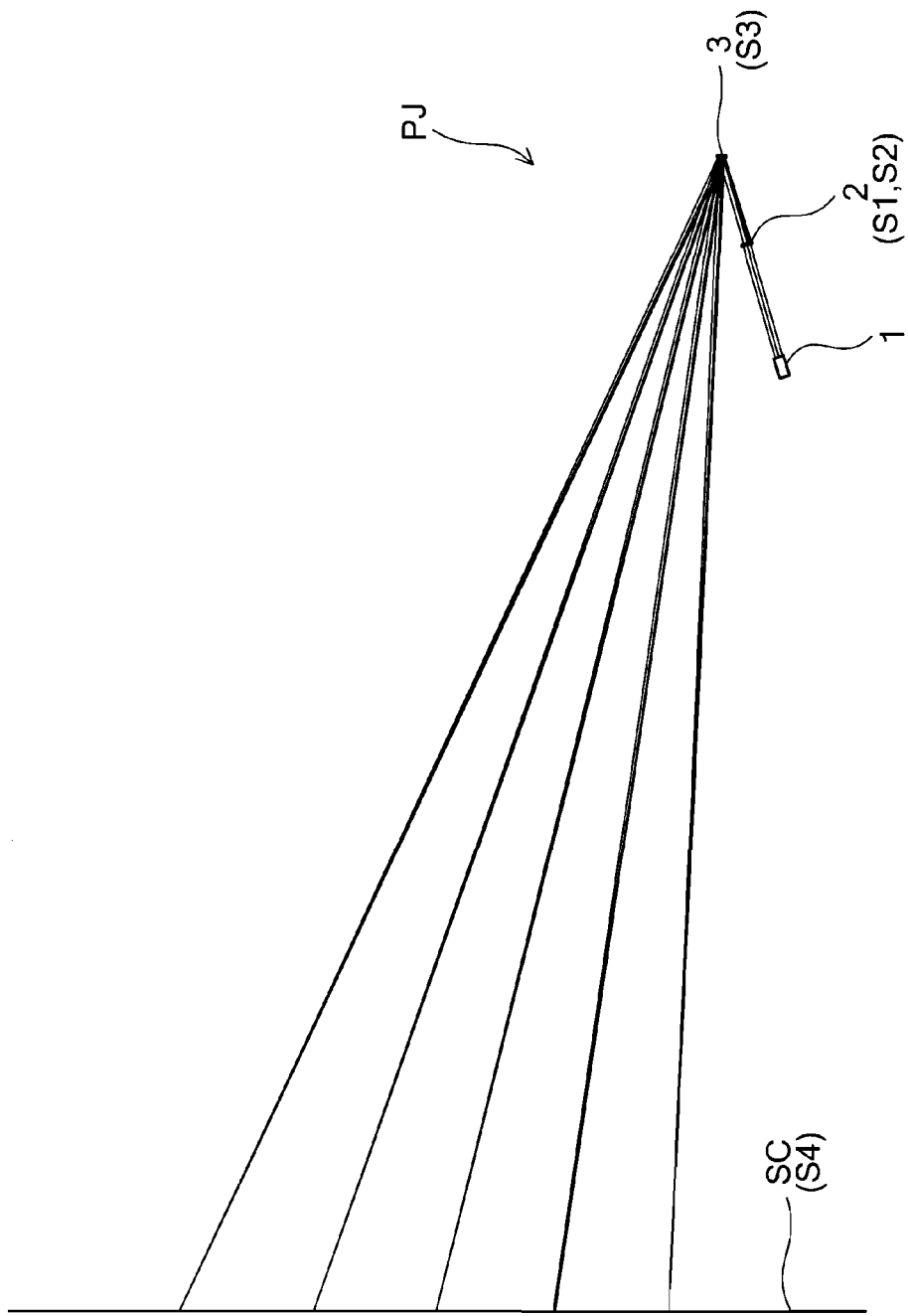
FIG. 3 is a vertical sectional view showing the overall structure of a laser projector according to Embodiment 2 of the present invention.
Figure 4:
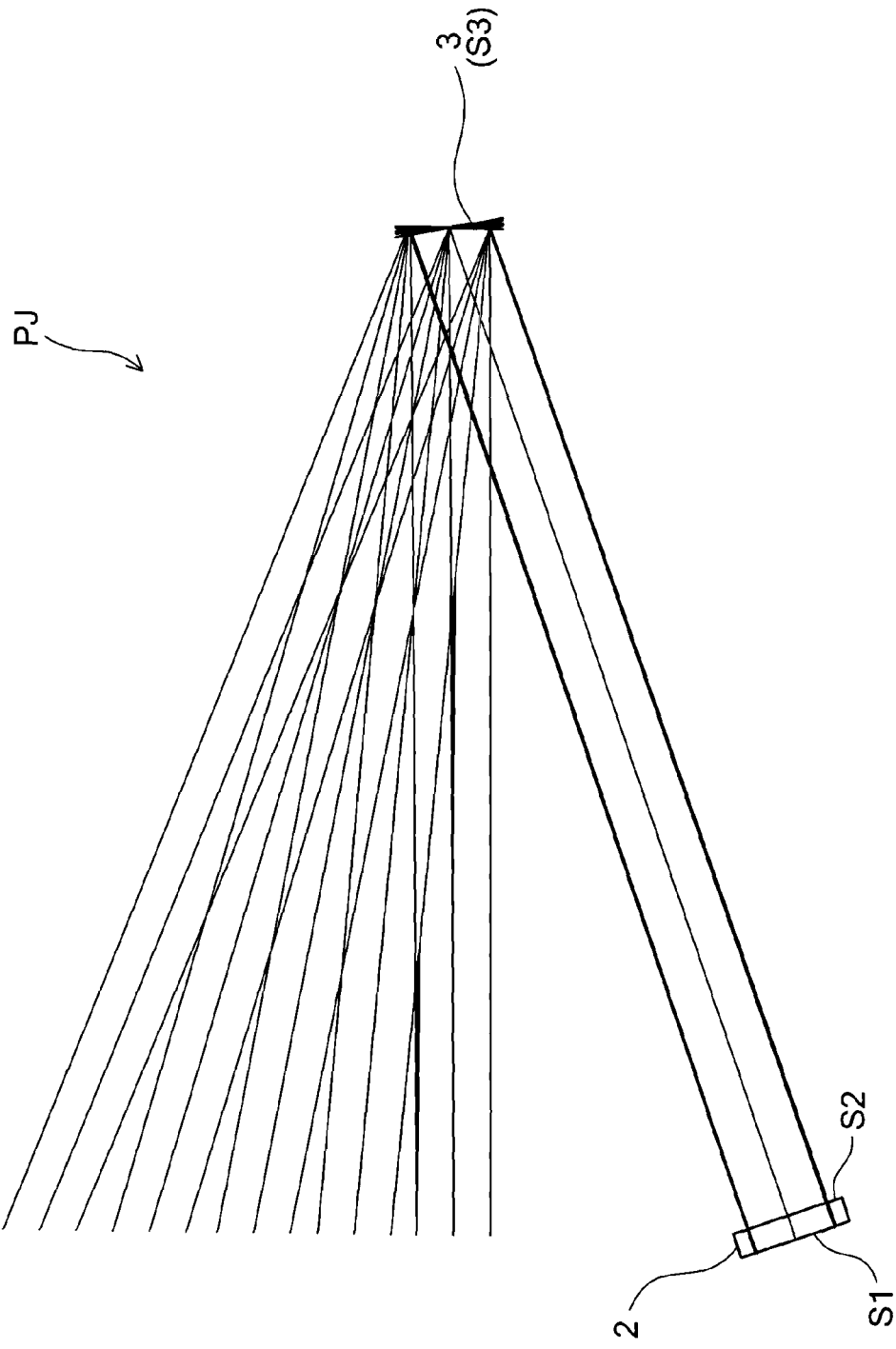
FIG. 4 is a vertical sectional view showing in an enlarged manner a principal part of the above laser projector.
Figure 5:
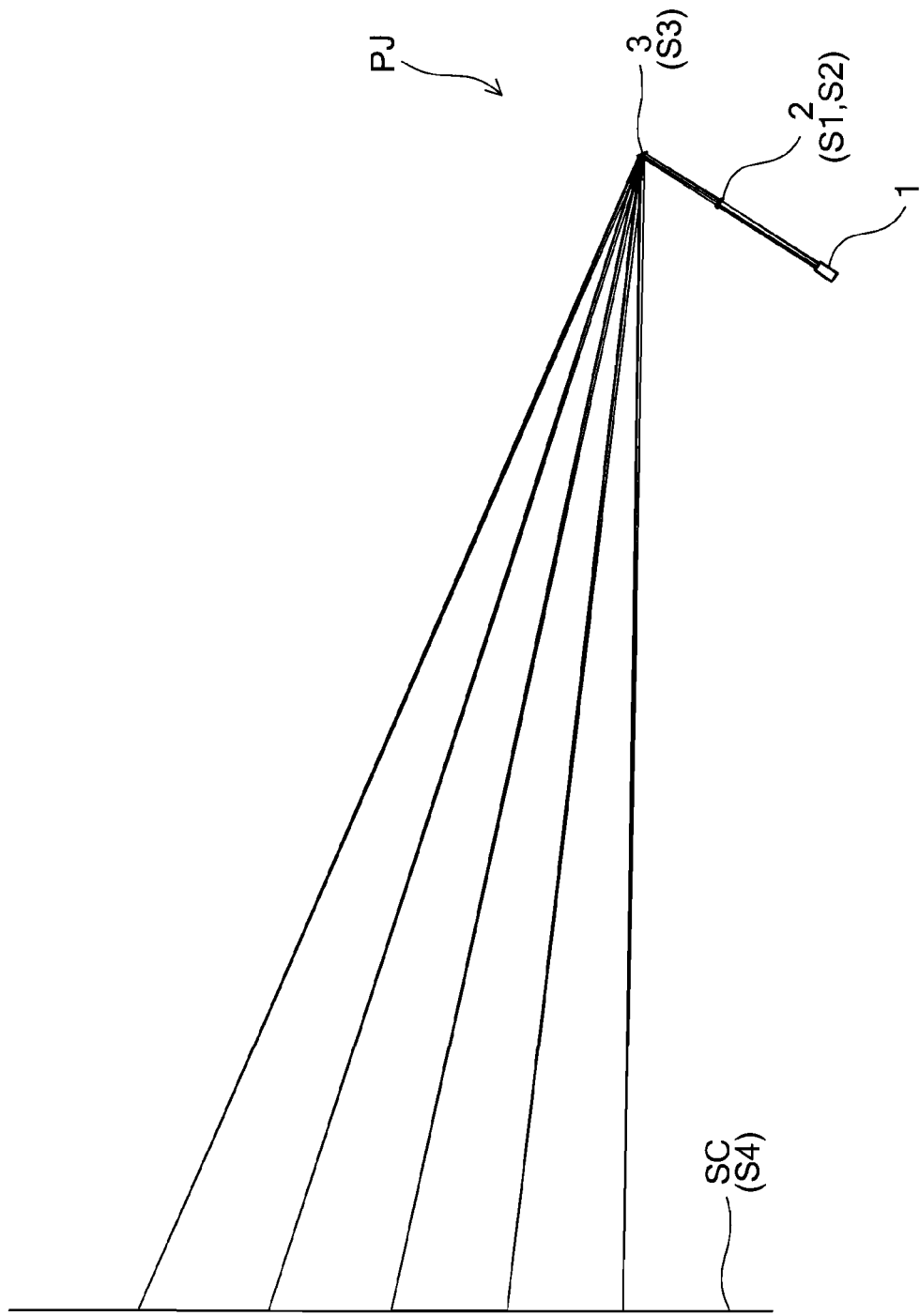
FIG. 5 is a vertical sectional view showing the overall structure of a laser projector according to Embodiment 3 of the present invention.
Figure 6:
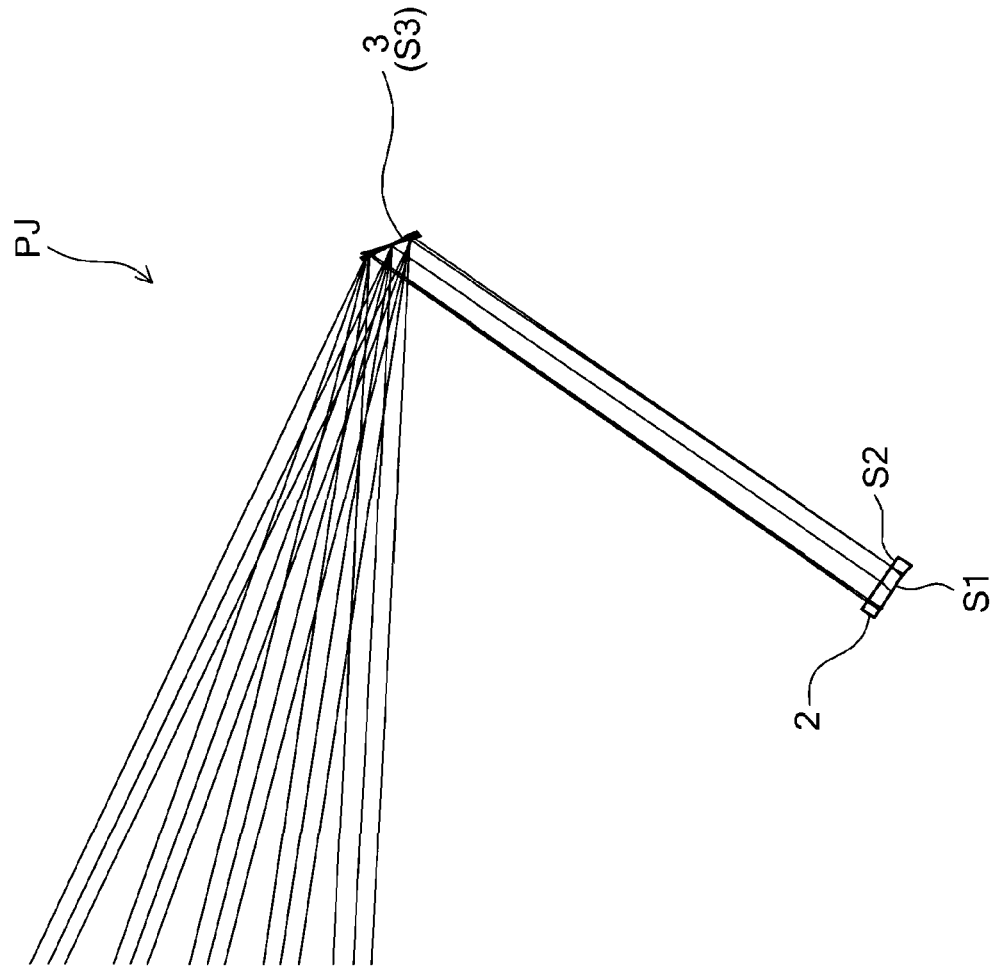
FIG. 6 is a vertical sectional view showing in an enlarged manner a principal part of the above laser projector.
Figure 7:
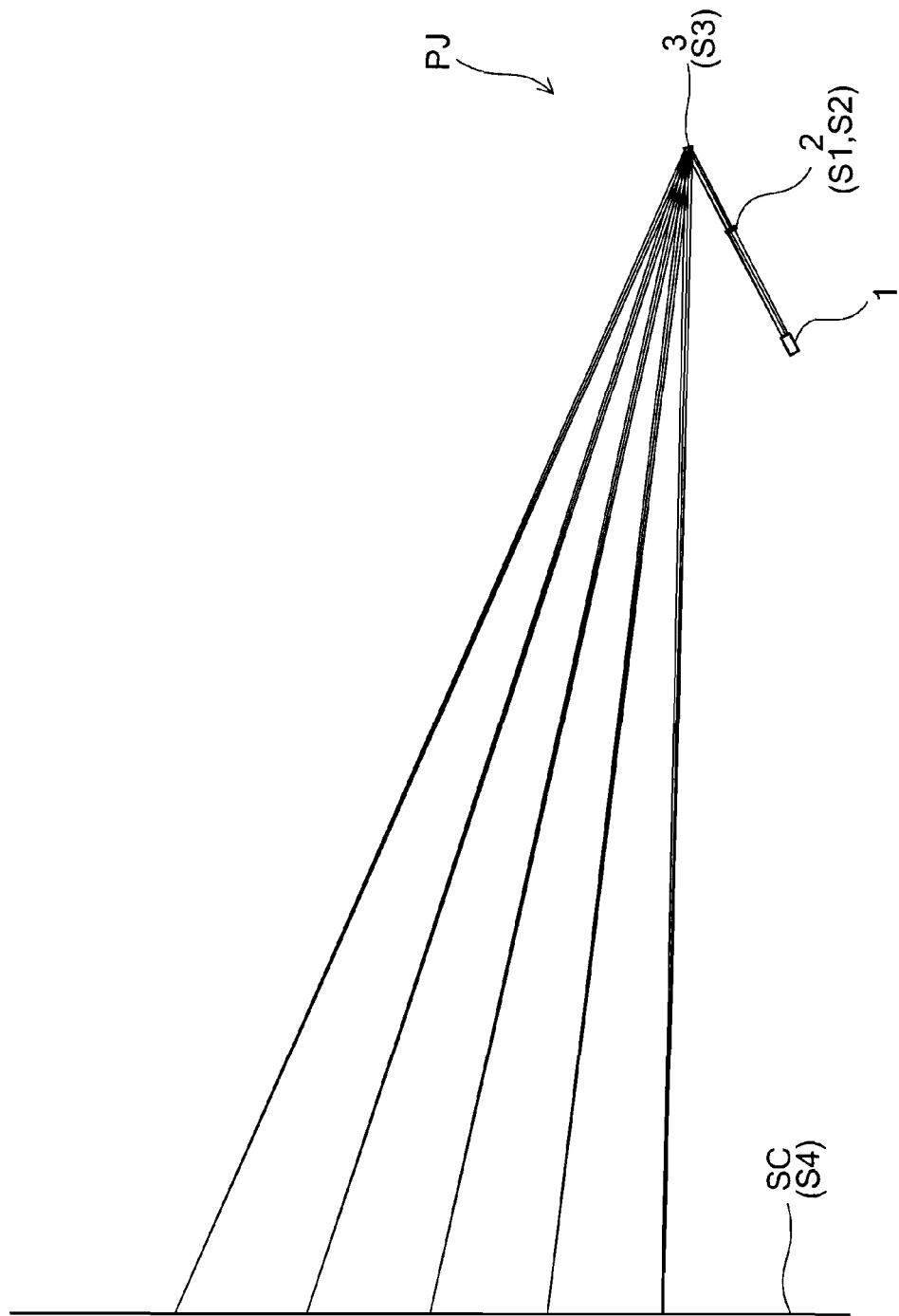
FIG. 7 is a vertical sectional view showing the overall structure of a laser projector according to Embodiment 4 of the present invention.
Figure 8:
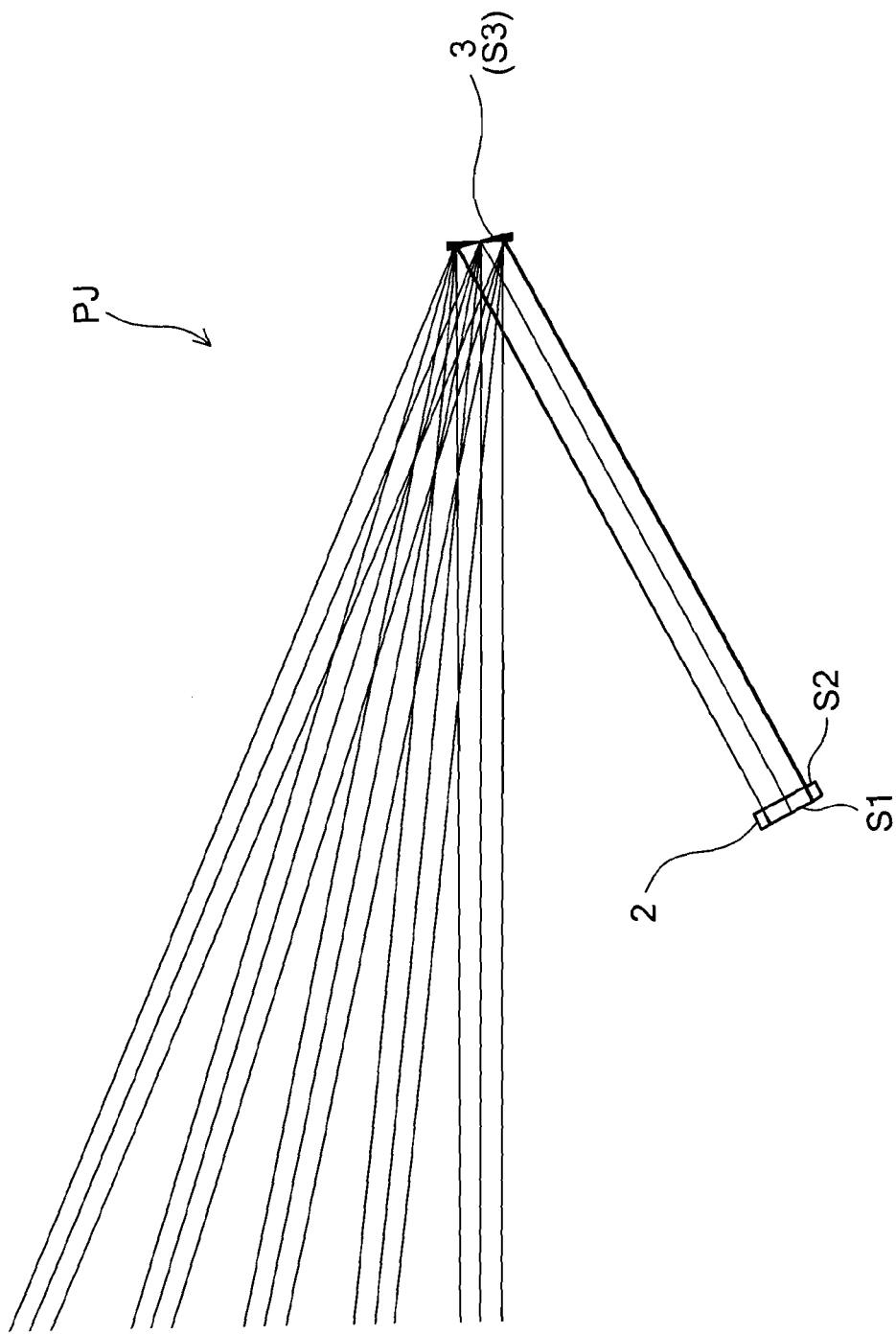
FIG. 8 is a vertical sectional view showing in an enlarged manner a principal part of the above laser projector.

FIG. 1 is a vertical sectional view showing the overall structure of a laser projector PJ of Embodiment 1, and FIG. 2 is a vertical sectional view showing in an enlarged manner a principal part of the laser projector PJ. FIG. 3 is a vertical sectional view showing the overall structure of a laser projector PJ of Embodiment 2, and FIG. 4 is a vertical sectional view showing in an enlarged manner a principal part of the laser projector PJ. FIG. 5 is a vertical sectional view showing the overall structure of a laser projector PJ of Embodiment 3, and FIG. 6 is a vertical sectional view showing in an enlarged manner a principal part of the laser projector PJ. FIG. 7 is a vertical sectional view showing the overall structure of a laser projector PJ of Embodiment 4, and FIG. 8 is a vertical sectional view showing in an enlarged manner a principal part of the laser projector PJ.

The laser projectors PJ of Embodiments 1 to 4 each include a laser light source 1, an incidence optical system 2, and a deflection apparatus 3. These laser projectors PJ employ an angular separation method in which light is made to obliquely enter the deflection apparatus 3 to separate incident light and reflected light from each other. Each of the laser projectors PJ performs projection obliquely from the V direction with respect to a screen SC by deflecting light from the laser light source 1 by the deflection apparatus 3.

The laser light source 1 is a light source apparatus that emits laser light, and here, it is formed of a light source that emits laser light of three colors of RGB, and a color synthesizer. The color synthesizer synthesizes optical paths of RGB laser light to emit light, and is formed with, for example, a dichroic prism or a dichroic mirror.

The incidence optical system 2 is provided in the optical path between the laser light source 1 and the deflection apparatus 3, and is a light collecting lens that is, for example, formed of a convex lens. The incidence optical system 2 is provided for minimizing the beam diameter on the screen SC when light emitted from the laser light source 1 is projected thereon via the deflection apparatus 3.

The deflection apparatus 3 is a two-dimensional deflector, which receives light from the laser light source 1 via the incidence optical system 2, deflects the light in the H direction (a first scanning direction) and the V direction (a second scanning direction) that are perpendicular to each other, and two-dimensionally scans the screen SC with the deflected light. The deflection apparatus 3 is formed with, for example, an MEMS mirror. A detailed description of the deflection apparatus 3 will be given later. The deflection apparatus 3 is sinusoidally-driven (resonance-driven at high speed) in the H direction, while it is linearly-driven (driven at low speed) in the V direction. That is, its scanning speed is higher in the H direction than in the V direction.

According to this structure, light from the laser light source 1 obliquely enters the deflection apparatus 3 via the incidence optical system 2 to be deflected by being reflected by a reflection member (a later-described mirror 10) of the deflection apparatus 3 in the H and V directions, to be projected obliquely in the V direction with respect to the screen SC. The output of the laser light source 1 is adjusted according to the deflection state of the deflection apparatus 3 (that is, according to the tilted position of the reflection member) while the deflection apparatus 3 performs scanning across the screen SC with the light, and thereby a two-dimensional image can be displayed on the screen SC.

2. Detailed Description of Deflection Apparatus

Figure 9:
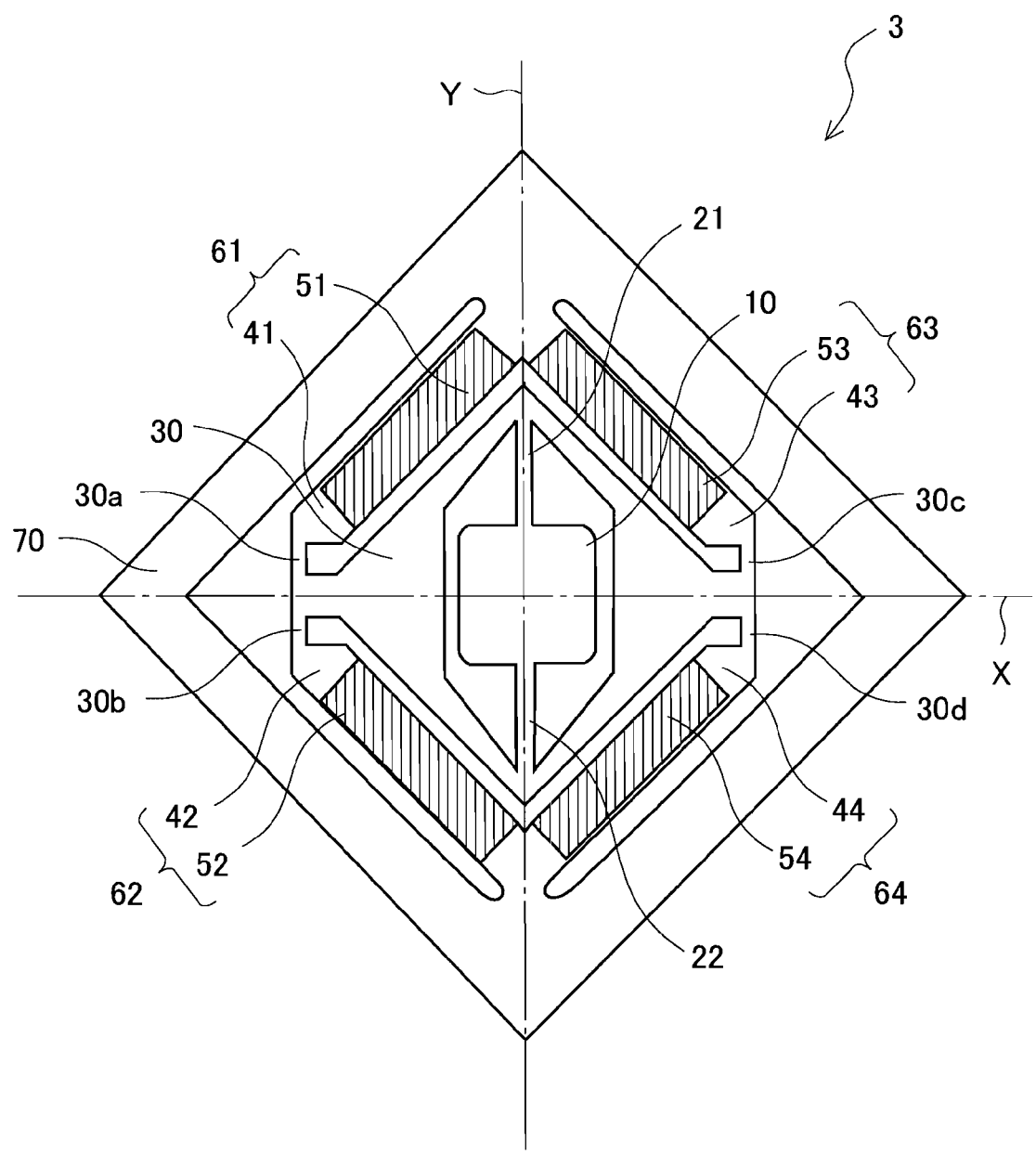
FIG. 9 is a plan view schematically showing the structure of a deflection apparatus incorporated in each of the above laser projectors.

Next, a detailed description will be given of the structure of the above deflection apparatus 3. FIG. 9 is a plan view schematically showing the structure of the deflection apparatus 3. FIGS. 10(a) to 10(e) are sectional views showing the deflection apparatus 3 of FIG. 9 when it is cut along a section perpendicular to an X-axis. The deflection apparatus 3 is an MEMS mirror provided with the mirror 10, a movable frame 30, and a stationary frame 70. The stationary frame 70 is a portion for fixing the deflection apparatus 3 to a housing (not shown). Inside the stationary frame 70, the movable frame 30 is formed in a frame-shape as a movable portion. Inside the movable frame 30, the mirror 10 is formed in a square shape.

The mirror 10 constitutes the reflection member that two-dimensionally deflects light from the laser light source 1, and is elastically supported, via torsion bars 21 and 22, by the movable frame 30 located outside of the mirror 10. The torsion bars 21 and 22 extend, along a Y-axis that passes through the center of the mirror 10, outward from two opposing sides of the mirror 10.

The movable frame 30 is, via bendable beams 41 to 44, elastically supported by the stationary frame 70 located outside of the movable frame 30. One end of each of the bendable beams 41 to 44 is connected to a corresponding one of connection portions 30a to 30d of the movable frame 30, the connection portions 30a to 30d being located in the vicinity of an X-axis that is perpendicular to the Y-axis (that is, the X-axis is perpendicular to the torsion bars 21 and 22, and passes through the center of the mirror 10). The mirror 10, the torsion bars 21 and 22, the movable frame 30, the bendable beams 41 to 44, and the stationary frame 70 are integrally formed by anisotropically etching a silicon substrate.

Figure 10A:
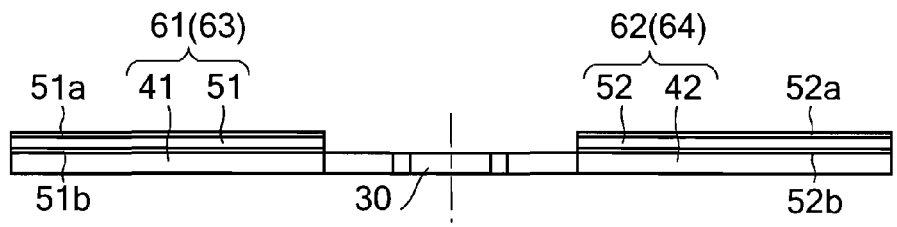
FIG. 10 is a diagram, (a) to (e) of which are sectional views showing the above deflection apparatus.

On surfaces of the bendable beams 41 to 44, piezoelectric elements 51 to 54, respectively, are adhered to form four unimorph portions 61 to 64, respectively. As shown in FIG. 10(a), on front and back sides of the piezoelectric element 51, an upper electrode 51a and a lower electrode 51b are provided, respectively; and on front and back sides of the piezoelectric element 52, an upper electrode 52a and a lower electrode 52b are provided, respectively. Likewise, on front and back sides of each of the piezoelectric elements 53 and 54, an upper electrode and a lower electrode are provided, respectively.

For example, application of an AC voltage to the upper and lower electrodes 51a and 51b within such a range that does not cause polarization inversion makes the piezoelectric element 51 expand/contract to be displaced in the thickness direction in a unimorph manner. Thus, as a result of the bending-deformation of the piezoelectric elements 51 to 54 caused by the voltage application to each of the electrodes, the bendable beams 41 to 44 make independent rotation torques act around the Y-axis and around the X-axis with respect to the movable frame 30. This makes it possible to make the movable frame 30 rotate with the Y-axis and the X-axis as two axes. A detailed description of such a rotation movement will be given below.

Figure 10B:
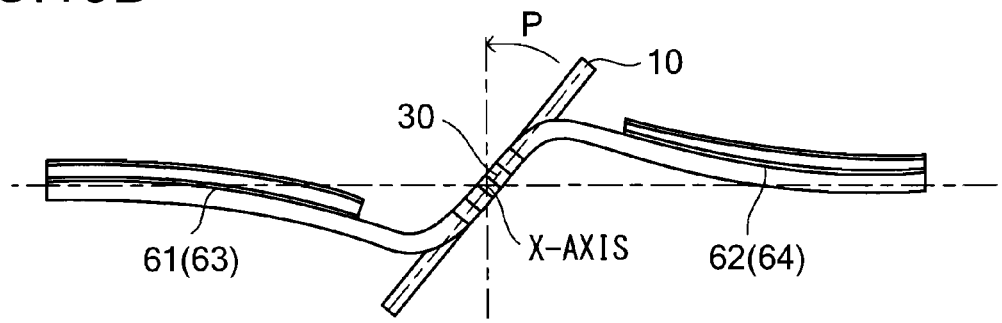

First, the rotation movement around the X-axis will be described. When the piezoelectric elements 51 and 52 are in a state in which they have neither expanded nor contracted as shown in FIG. 10(a), a voltage is applied to the piezoelectric element 51 such that the piezoelectric element 51 expands, and a voltage (that is opposite in phase to the voltage applied to the piezoelectric element 51) is applied to the piezoelectric element 52 such that the piezoelectric element 52 contracts. Then, since one end of each of the unimorph portions 61 and 62 is fixed to and held by the stationary frame 70, as shown in FIG. 10(b), the unimorph portion 61 is bent such that the other end thereof is displaced downward, while the unimorph portion 62 is bent such that the other end thereof is displaced upward.

Figure 10C:
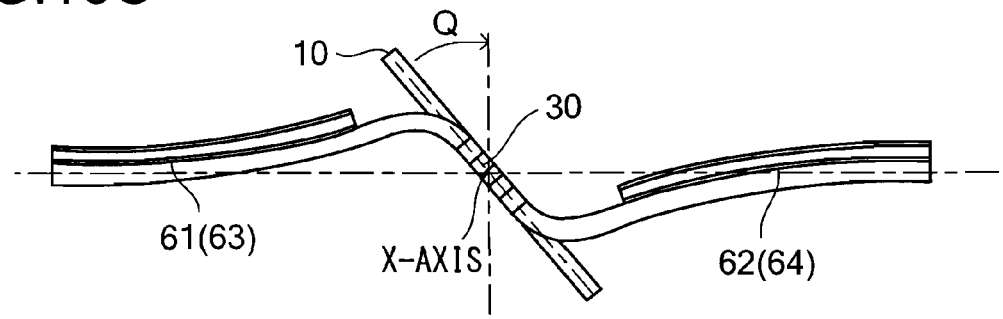
Figure 10D:
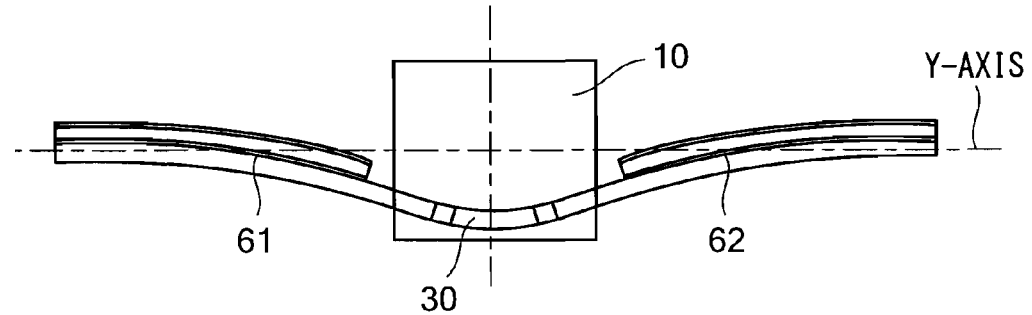

Likewise, when voltages equivalent in phase to those applied to the piezoelectric elements 51 and 52 are applied to the piezoelectric elements 53 and 54, respectively, since one end of each of the unimorph portions 63 and 64 are fixed to and held by the stationary frame 70, the unimorph portion 63 is bent such that the other end thereof is displaced downward, while unimorph portion 64 is bent such that the other end thereof is displaced upward. As a result, rotation torque around the X-axis acts on the movable frame 30, and thereby the movable frame 30 is moved to be tilted in one direction (P direction) with respect to the X-axis. On the same principle, when voltages reverse in phase to those described above are applied to the piezoelectric elements 51 to 54, rotation torque of opposite direction around the X-axis acts on the movable frame 30, and thereby the movable frame 30 is, as shown in FIG. 10(c), moved to be tilted with respect to the X-axis in a direction (Q direction) that is reverse to the direction described above.

When AC voltages having the above-described phase relationship among them are applied to the piezoelectric elements 51 to 54, the unimorph portions 61 to 64 repeat oscillating in the up-and-down direction following the AC voltages, see-saw-like rotation torque acts on the movable frame 30, and the movable frame 30 moves in rotational oscillation around the X-axis until it reaches a predetermined displacement angle. The connection portions 30a to 30d, via which the unimorph portions 61 to 64 are connected to the movable frame 30, respectively, have narrow widths, and thus can be bent more easily than the other portions. Thus, slight warp of the unimorph portions 61 to 64 can largely slant the movable frame 30 in the vicinity of the X-axis as shown in FIGS. 10(b) and 10(c), and thereby the mirror 10 can be significantly tilted. Incidentally, in addition to forming the connection portions 30a to 30d narrow in width, they may be formed thinner than the other portions.

Figure 10E:
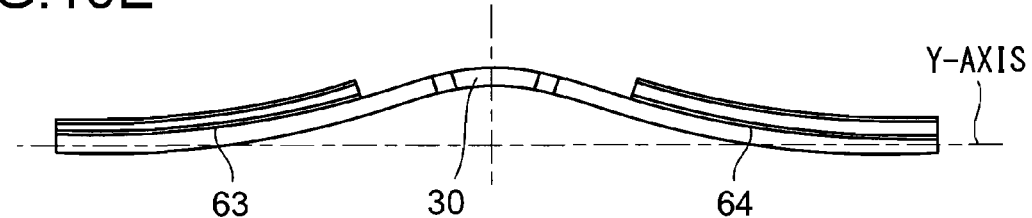

Next, a description will be given of a rotation movement around the Y-axis. When voltages are applied to the piezoelectric elements 51 and 52 such that they expand, since one end of each of the unimorph portions 61 and 62 is fixed to and held by the stationary frame 70, each of the unimorph portions 61 and 62 is bent such that the other end thereof is displaced downward. On the other hand, when voltages opposite in phase to those applied to the piezoelectric elements 51 and 52, respectively, are applied to the piezoelectric elements 53 and 54 (that is, voltages are applied such that the piezoelectric elements 53 and 54 contract), since the one end of each of the unimorph portions 63 and 64 is fixed to and held by the stationary frame 70, the unimorph portions 63 and 64 are bent such that the other end of each of the unimorph portions 63 and 64 is displaced upward as shown in FIG. 10(e). Incidentally, the mirror 10 is omitted in FIG. 10(e) for the convenience of description. Thus, rotation torque around the Y-axis acts on the movable frame 30, and thereby the movable frame 30 is moved to be tilted with respect to the Y-axis.

When AC voltages having the above-described phase relationship among them are applied to the piezoelectric elements 51 to 54, the unimorph portions 61 to 64 repeat oscillating in the up-and-down direction following the AC voltages, see-saw-like rotation torque acts on the movable frame 30, and the movable frame 30 moves in rotational oscillation around the Y-axis until it reaches a predetermined displacement angle. Thus, by applying a predetermined voltage to each of the four unimorph portions 61 to 64, it is possible to freely control the tilt of the mirror 10 supported by the movable frame 30 around the X-/Y-axis.

As described above, the deflection apparatus 3 is driven by a piezoelectric driving method in which light emitted from the laser light source 1 to enter the mirror 10 is deflected by applying voltages to the piezoelectric elements 51 to 54 to rotate the mirror 10. Here, examples of MEMS mirror driving methods include, in addition to the above-described piezoelectric driving method, an electromagnetic driving method and an electrostatic driving method. With the electromagnetic driving method, it is necessary to dispose a permanent magnet on the rear surface of the reflection member, which increases the size of the deflection apparatus, and thus the electromagnetic driving method is disadvantageous to reducing the thickness of the device. With the electrostatic method, the reflection member is driven by using electrostatic force of an electrode facing the reflection member, and thus a disadvantageously high driving voltage is required. In contrast, with the above-described piezoelectric driving method, incident light can be deflected by applying voltages to the thin piezoelectric elements to rotate the reflection member, and in addition, this method does not require a high driving voltage. Thus, employing the piezoelectric driving method as the driving method of the deflection apparatus 3 contributes to reducing the thickness of the device, and furthermore, power consumption thereof can be reduced as well.

Incidentally, although the mirror 10 is formed in a square shape here, this is not meant as a limitation; instead, for example, the mirror 10 may be formed in a circular shape having a diameter of about 1.5 mm.

3. Structure for Reducing Trapezoidal Distortion

Next, a description will be given of a structure for reducing trapezoidal distortion occurring due to oblique projection in the laser projector PJ. Incidentally, for convenience of description, terms used in the following descriptions are defined as follows.

Figure 11:
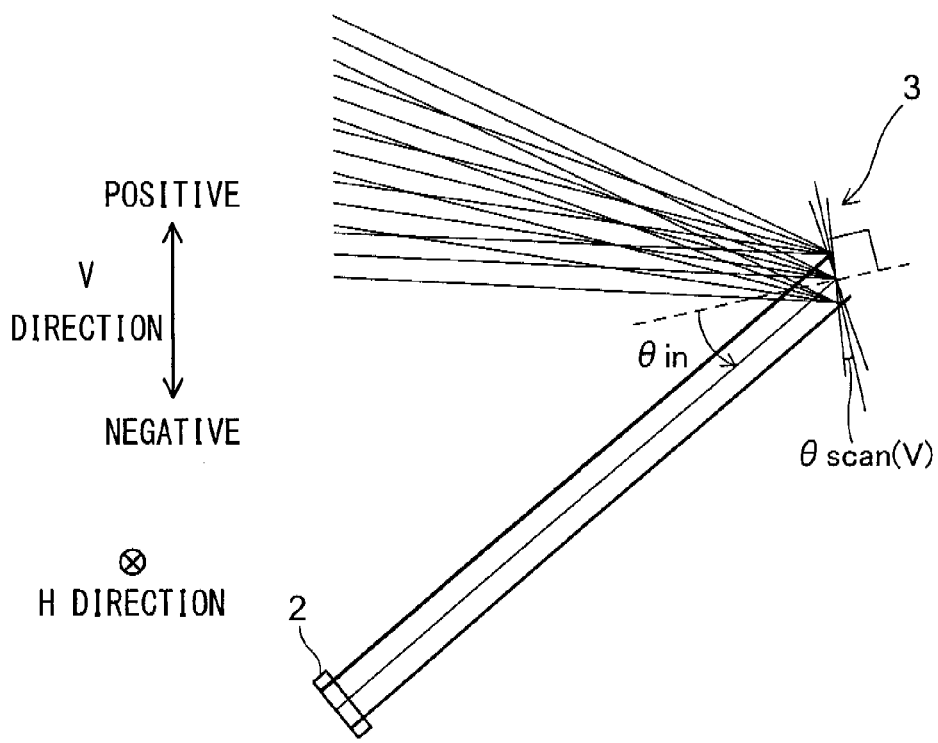
FIG. 11 is an explanatory diagram for illustrating θin and θscan(V)
Figure 12:
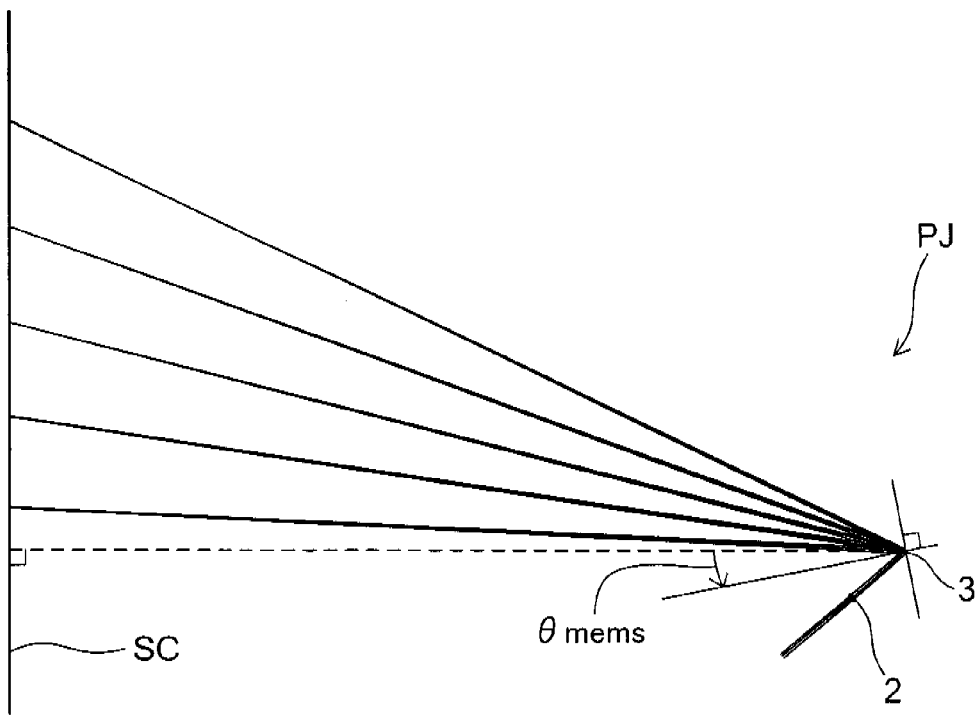
FIG. 12 is an explanatory diagram for illustrating θmems.
Figure 13:
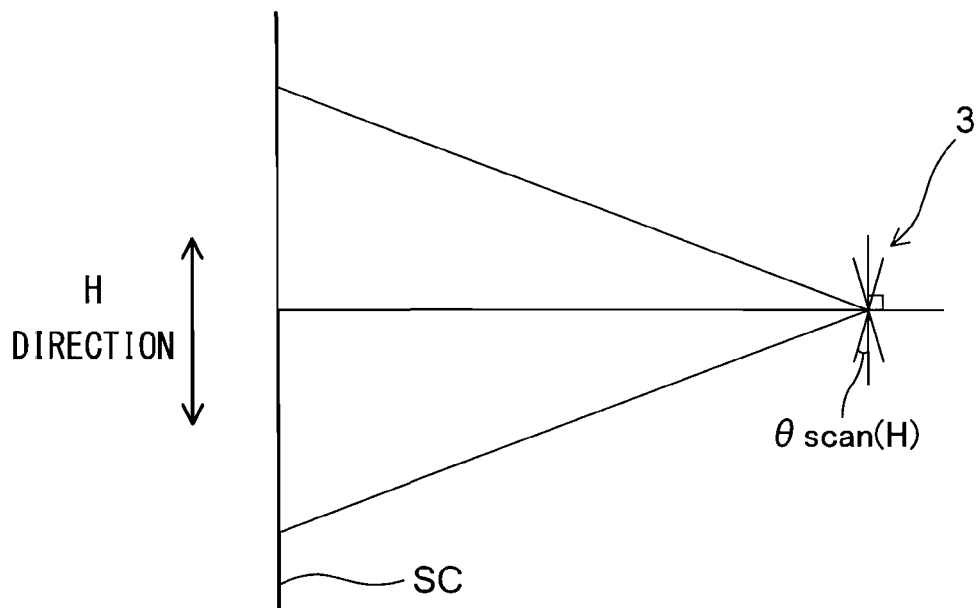
FIG. 13 is an explanatory diagram for illustrating θscan (H)

First, "screen-center display state" denotes a deflection state of the deflection apparatus 3 (that is, state of tilt of the mirror 10) in which light emitted from the laser light source 1 is deflected by the deflection apparatus 3 to be incident on the center of the screen SC. As shown in FIG. 11, a V-direction incidence angle at which a principal ray (a center ray) from the laser light source 1 is incident on the mirror 10 of the deflection apparatus 3 in the screen-center display state is denoted by $\theta in(°)$. As shown in FIG. 12, an angle formed by the normal line of the mirror 10 of the deflection apparatus 3 and the normal line of the screen SC in the screen-center display state is denoted by $\theta mems(°)$. Also, as shown in FIG. 11, the mechanical scanning angle in the V direction from the screen-center display state of the deflection apparatus 3 is denoted by $\theta scan(V)(°)$, and as shown in FIG. 13, the mechanical scanning angle in the H direction from the screen-center display state of the deflection apparatus 3 is denoted by $\theta scan(H)(°)$. Incidentally, when $\theta scan(V)$ and $\theta scan(H)$ are described as positive values, they indicate the values themselves in some cases, and in other cases, they indicate the absolute values of the mechanical scanning angles.

Evaluation of trapezoidal distortion is calculated by the following formula, where B3 (unit: mm) is the length of a line connecting the top-left and top-right corners of a projected image area; B1 (unit: mm) is the length of a line connecting the bottom-left and bottom-right corners of the projected image area; and B2 (unit: mm) is the length of a horizontal line passing through the center of the projected image area.

$$\text{Trapezoidal distortion}(\%) = \{(B3-B1)/B2\} \times 100$$

If oblique projection is performed in a state where the deflection apparatus 3 is arranged parallel with respect to the screen SC, trapezoidal distortion theoretically occurs to a projected image. However, by the oblique projection with respect to the screen SC in the state of the deflection apparatus 3 being arranged tilted with respect to the screen SC, it is possible to reduce the degree of oblique projection onto the screen SC. Thereby can be reduced the above-described trapezoidal distortion.

Figure 15:
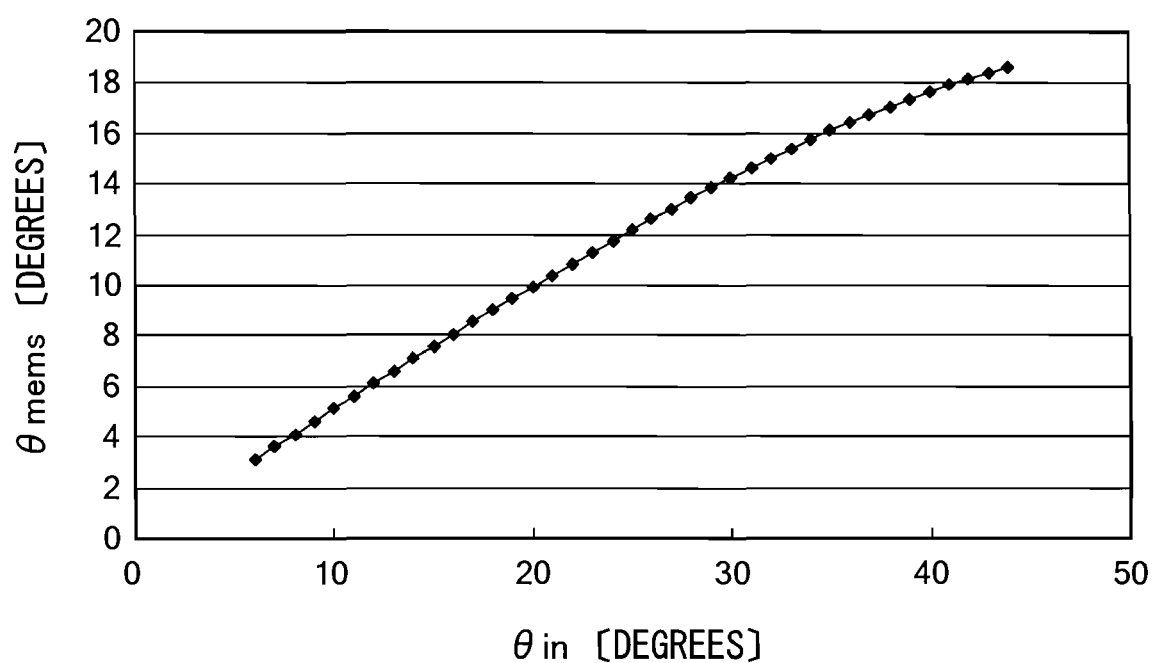
FIG. 15 is a graph showing the relationship between θin and θmems when trapezoidal distortion is minimum.

For example, FIG. 15 is a graph showing the relationship between $\theta in$ and $\theta mems$ when trapezoidal distortion is minimum. Incidentally, the minimum trapezoidal distortion indicates that the absolute value of a value obtained by the above mentioned trapezoidal distortion formula is the smallest, that is, 0. Here, it is assumed that $\theta scan(H)$ is $\pm 8°$ for example, and $\theta scan(V)$ is $\pm 6°$, for example. The figure shows that, with the angular separation method, trapezoidal distortion can be minimized by generating a $\theta mems$, that is, by making the mirror 10 of the deflection apparatus 3 tilted with respect to the screen SC toward the light incident side in the V direction in the screen-center display state.

In view of these facts, in each of the laser projectors PJ, the deflection apparatus 3 is arranged in the following manner. That is, assuming that the positive direction in the V direction, an oblique direction of projection onto the screen SC, is a direction along which the incidence angle of a ray deflected by the deflection apparatus 3 to be incident on the screen SC increases (and the reverse direction is the negative direction), the deflection apparatus 3 is arranged such that the normal line of the mirror 10 of the deflection apparatus 3 is tilted toward the negative direction side in the V direction with respect to the normal line of the screen SC when light from the laser light source 1 is incident on the deflection apparatus 3 from the negative direction side in the V direction (see FIG. 11). This makes it possible to reduce trapezoidal distortion without providing a projection optical system for correcting trapezoidal distortion at the screen SC side of the deflection apparatus 3. Thus, since no projection optical system is necessary, it is possible to reduce the thickness and the size of the device while reducing trapezoidal distortion.

In particular, although a projection surface such as the screen SC, etc. is typically placed parallel to the V direction, arranging the deflection apparatus 3 such that it is tilted in the V direction with respect to the projection surface is effective in that the above described advantages can be obtained in the most common projection style in which oblique projection is performed with respect to such a projection surface.

In addition, since $\theta scan(H)$ is generally larger than $\theta scan(V)$, a structure in which oblique projection is performed by bending an optical path in the V direction in which the mechanical scanning angle is small, with the second scanning direction as the V direction, helps make an incidence angle of light incident on the deflection apparatus 3 smaller than in the structure in which oblique projection is performed in the H direction; the incidence angle is necessary for light deflection and light separation (separating incident light and reflected light from each other) at the deflection apparatus 3. This helps reduce the thickness of the device, and this leads to miniaturization of the entire device.

FIG. 15 also shows that the relationship between θin and θmems when trapezoidal distortion is minimum is substantially proportional. In FIG. 15, the relationship between θin and θmems can approximately be described by the expression θmems/θin=0.5, and thus by setting θin and θmems so as to satisfy this relationship, it is possible to minimize trapezoidal distortion. Trapezoidal distortion in a projected image, however, is not quite perceptible to the eyes of viewers if it is kept within the range of ±5%.

Figure 16:
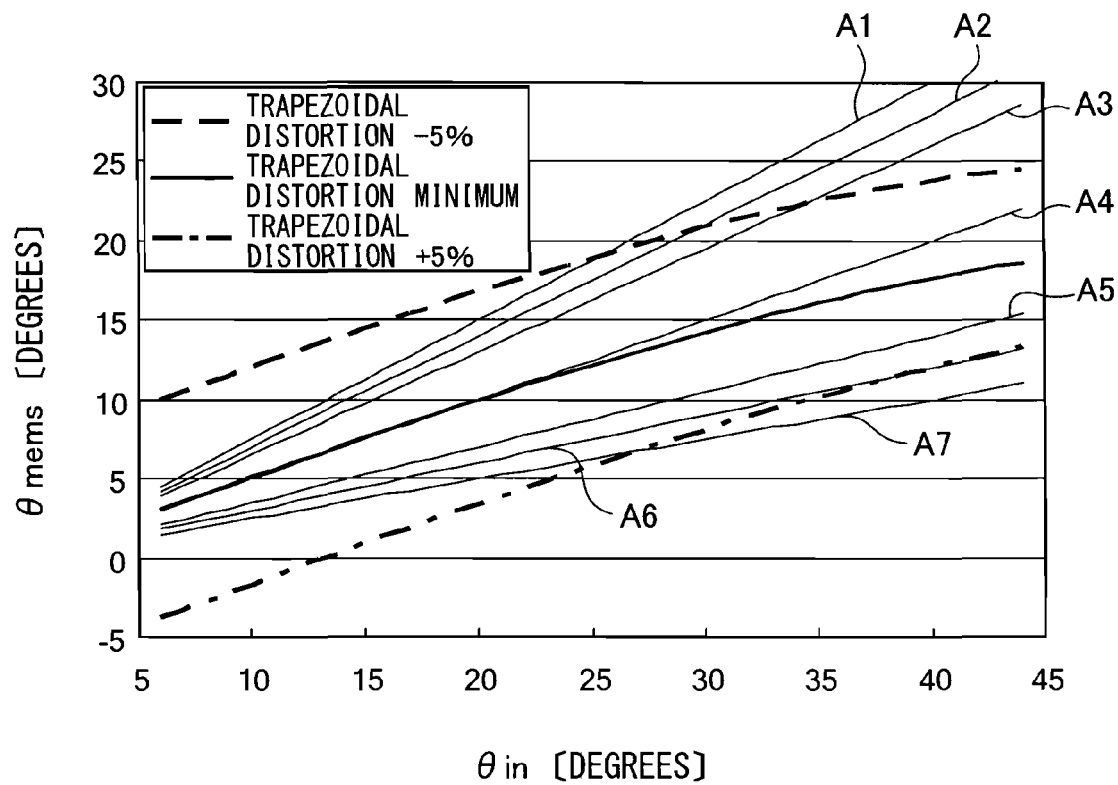
FIG. 16 is a graph with lines representing the relationship between θin and θmems when trapezoidal distortion is minimum and ±5%, and various other lines resulting from linearly-approximating the relationship between θin and θmems.

FIG. 16 is a graph showing the relationship between θin and θmems when trapezoidal distortion is minimum and ±5%, with lines resulting from linearly approximating the relationship between θin and θmems. Incidentally, lines A1 to A7 indicate that θmems and θin are in relationships such that θmems/θin=0.75, 0.7, 0.65, 0.5, 0.35, 0.3, and 0.25, respectively. Here, it is assumed that θscan(H) is, for example, ±8°, and θscan(V) is, for example, ±6°. From FIG. 16, it is possible to say that if the coordinates (θin, θmems) are within the region between the line A1 and the line A7, trapezoidal distortion is substantially within the range of ±5%. Thus, it can be said that a condition of reducing trapezoidal distortion of a projected image is to fulfill the following conditional expression (1).

$$0.25 < \theta\text{mems}/\theta\text{in} < 0.75 \quad (1)$$

That is, if the value of θmems/θin is smaller than the minimum value or larger than the maximum value of the conditional expression (1), trapezoidal distortion is beyond ±5%, which is large. Thus, by fulfilling the conditional expression (1), it is possible to keep trapezoidal distortion as small as within ±5%, and thus to obtain a preferable projected image. Incidentally, from the figure, it can be said that it is more advisable to fulfill the following conditional expression (1a), and that it is still more advisable to fulfill the following conditional expression (1b).

$$0.3 < \theta\text{mems}/\theta\text{in} < 0.7 \quad (1a)$$

$$0.35 < \theta\text{mems}/\theta\text{in} < 0.65 \quad (1b)$$

4. Bending of Optical Path of Light Incident on Deflection Apparatus

Figure 18:
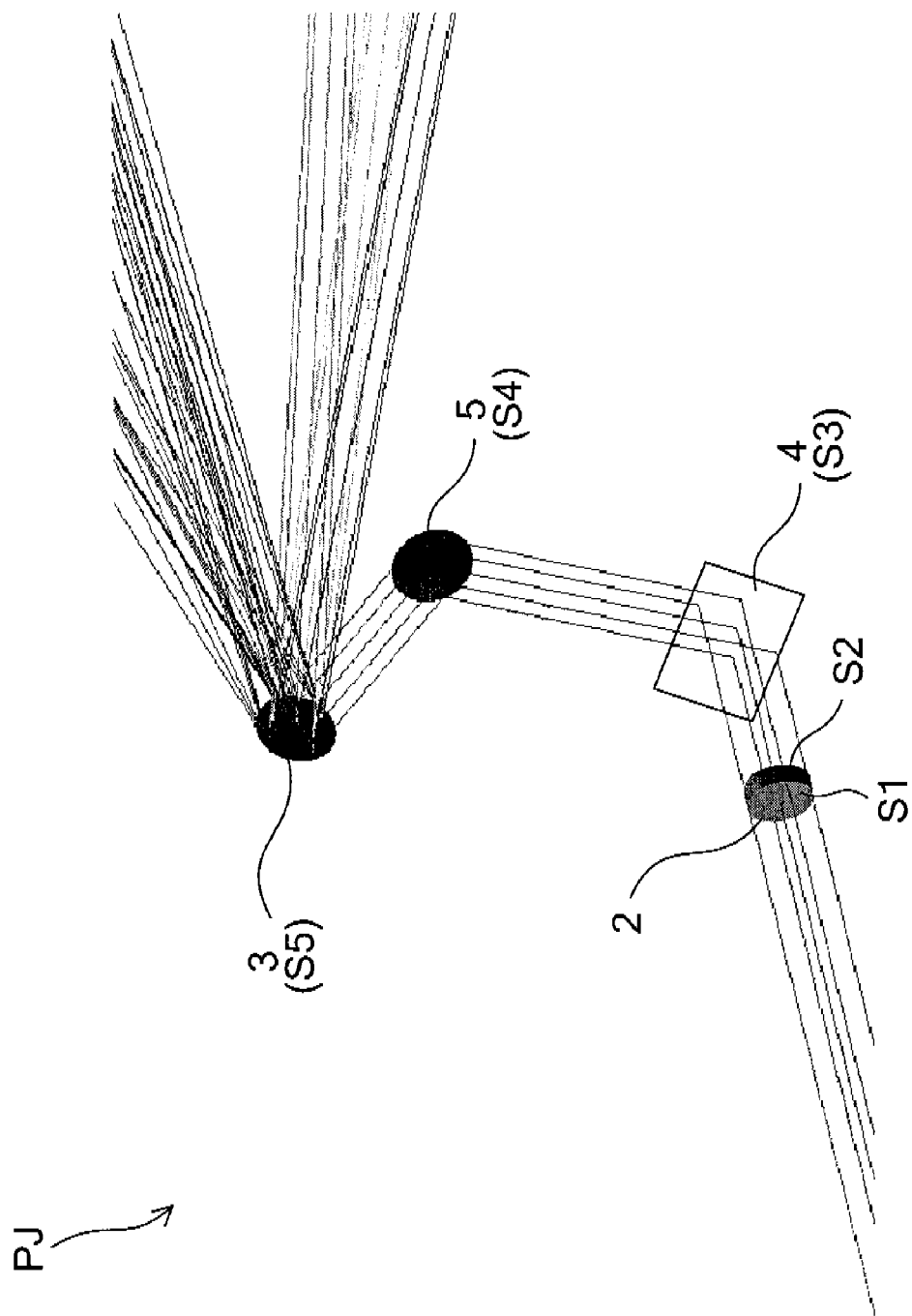
FIG. 18 is a perspective view schematically showing an optical path in the above laser projector.

FIG. 17(*a*) is a front view showing the structure of a modified example of the laser projector PJ of Embodiment 4, and FIG. 17(*b*) is a side view of the laser projector PJ. FIG. 18 is a perspective view schematically showing an optical path in the laser projector PJ. The laser projector PJ is, in addition to the laser light source 1, the incidence optical system 2, and the deflection apparatus 3, further provided with an upward-reflection mirror 4 and a downward-reflection mirror 5. The upward-reflection mirror 4 is a first mirror that reflects light projected from the laser light source 1 upward in a twisting direction. The downward-reflection mirror 5 is a second mirror that reflects light reflected upward by the upward-reflection mirror 4 downward to the deflection apparatus 3. Now, a detailed description will be given of the structure of the laser light source 1.

The laser light source 1 includes: light sources 1B, 1G and 1R; lenses 6B, 6G and 6R; a mirror 7; and dichroic mirrors 8 and 9. Laser light B emitted in the H direction from the light source 1B is incident via the lens 6B on the mirror 7, where the optical path of the laser light B is bent in the V direction, and then the laser light B is incident on the dichroic mirror 8. Laser light G emitted in the H direction from the light source 1B is incident via the lens 6G on the dichroic mirror 8, where the optical path of the laser light G is synthesized with the optical path of the laser light B, and then the laser light G is emitted in the V direction to be incident on the dichroic mirror 9. Laser light R emitted in the H direction from the light source 1R is incident via the lens 6R on the dichroic mirror 9, where the optical path of the laser light R is synthesized with the optical paths of the laser light B and G, and then the laser light R is emitted in the H direction to be incident on the incidence optical system 2. Thus, the direction in which light is emitted from the entire laser light source 1 is the H direction.

In the above laser projector PJ, the normal line direction (a direction parallel to the surface of the sheet on which FIG. 17(*b*) is drawn) of the mirror 10 of the deflection apparatus 3 in the screen-center display state is orthogonal to the direction (the H direction) in which light is emitted from the laser light source 1. And the light from the laser light source 1 is reflected upward from the upward-reflection mirror 4 in the twisting direction, and then reflected downward from the downward-reflection mirror 5 to the deflection apparatus 3. This structure makes it possible to bend the optical path of light, emitted in the H direction from the laser light source 1, in the thickness direction of the device (a direction perpendicular to the H direction and the V direction, and thus the thickness of the entire device can be reduced.

5. θin/θscan(V)

According to the principle, θin needs to be larger than θscan(V) to perform light separation to separate light incident on the deflection apparatus 3 and light reflected from the deflection apparatus 3 from each other. However, a too small θin increases the distance necessary to perform the light separation, that is, the distance in the direction of the normal line of the deflection apparatus 3, and this results in increase of thickness of the device as a whole. As an aim of reducing the thickness of the device, it is advisable that the distance necessary to perform the light separation be equal to or shorter than 10 times the diameter of the mirror 10 of the deflection apparatus 3. Considering provision of the above-mentioned reflection mirror (the upward-reflection mirror 4 and the downward-reflection mirror 5) and the like, it is more advisable that the distance necessary for the light separation be equal to or shorter than eight times the diameter of the mirror 10.

Figure 19:
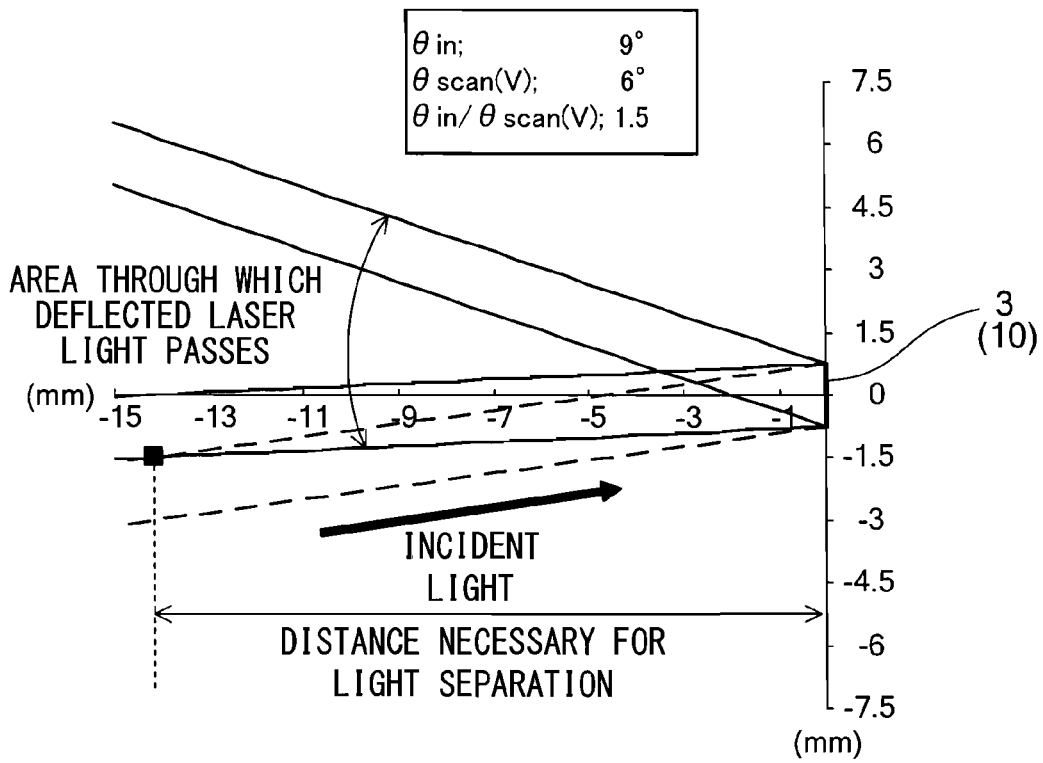
FIG. 19 is an explanatory diagram schematically showing optical paths of light incident on/reflected from the mirror of a deflection apparatus when θin/θscan(V) is equal to 1.5.

Here, FIG. 19 is an explanatory diagram schematically showing optical paths of light incident on/reflected from the mirror 10 of the deflection apparatus 3 when θin is equal to 9° and θscan(V) is equal to 6°, that is, θin/θscan(V) is equal to 1.5. Incidentally, the vertical axis of the figure indicates the length (unit: mm) of the mirror 10 of the deflection apparatus 3 in the V direction, and the horizontal axis indicates the distance (unit: mm) necessary for the light separation. Furthermore, in the figure, the area through which deflected laser light passes indicates an area through which passes deflected laser light resulting from the mirror 10 deflecting laser light within the range of θscan(V)=±6°. From the figure, if the length of the mirror 10 in the V direction is 1.5 mm, the distance necessary for light separation is 14.15 mm, which is shorter than 10 times (equal to 9.4 times) the length of the mirror 10 in the V direction.

Figure 20:
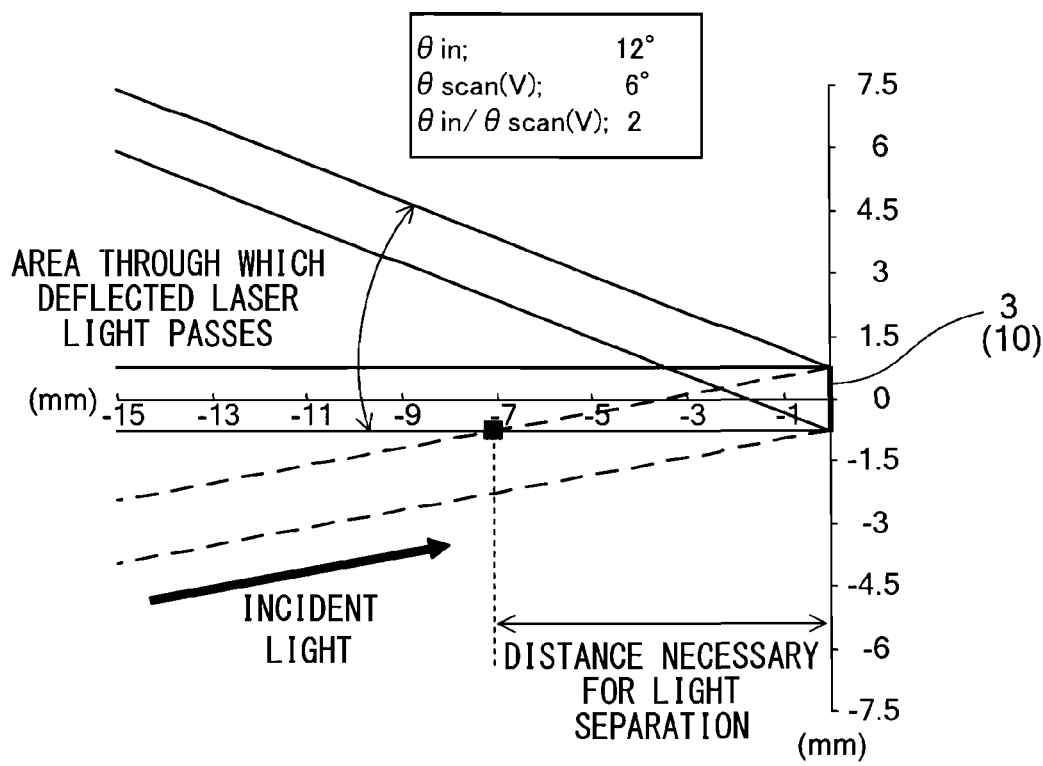
FIG. 20 is an explanatory diagram schematically showing optical paths of light incident on/reflected from the mirror of a deflection apparatus when θin/θscan(V) is equal to 2.

FIG. 20 is an explanatory diagram schematically showing optical paths of light incident on/reflected from the mirror 10 of the deflection apparatus 3 when θscan(V) is equal to 6° and θin is equal to 12°, that is, when θin/θscan(V) is equal to 2. From the figure, if the length of the mirror 10 in the V direction is 1.5 mm, the distance necessary for light separation is 7.06 mm, which is shorter than 8 times (equal to 4.7 times) the length of the mirror 10 in the V direction.

From the above description, it can be said that it is advisable that the laser projectors PJ of Embodiments 1 to 4 fulfill the following conditional expression (2), and that it is more advisable that the laser projectors PJ of Embodiments 1 to 4 fulfill the conditional expression (2a). Satisfying the conditional expression (2) makes it possible to set the distance necessary for the light separation to be equal to or shorter than 10 times the length of the mirror 10 in the V direction, and thus to reduce the thickness of the device while securely performing light separation. Furthermore, satisfying the conditional expression (2a) makes it possible to set the distance necessary for the light separation to be equal to or shorter than 8 times the length of the mirror 10 in the V direction, and thus to reduce the thickness of the device while securing a space for providing the reflection mirror.

$$\theta in/\theta scan(V) > 1.5 \quad (2)$$

$$\theta in/\theta scan(V) > 2 \quad (2a)$$

Incidentally, in the scanning type laser projectors PJ, the minimum value of the spot size on the screen SC is determined by the diameter of an aperture stop plane (in many cases the mirror 10 of the deflection apparatus 3 functions as an aperture stop as well), and thus the resolution of an image in the V direction is determined from θscan(V). In the case in which the mirror 10 functions as the aperture stop as well, since the diameter of the mirror 10 is on the order of 1 to 2 mm, θscan(V) needs to be 5° or larger in order to achieve VGA or XGA. Thus, from the conditional expression (2), θin needs to be larger than 1.5×θscan(V) which is 7.5°.

6. Structure for Reducing Scan Distortion

Figure 14:
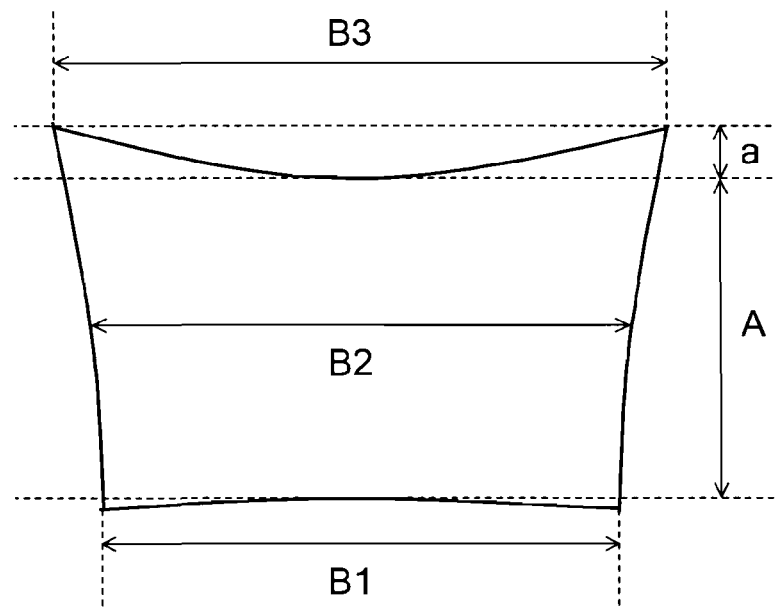
FIG. 14 is an explanatory diagram for illustrating trapezoidal distortion and scan distortion of a projected image area.
Figure 21:
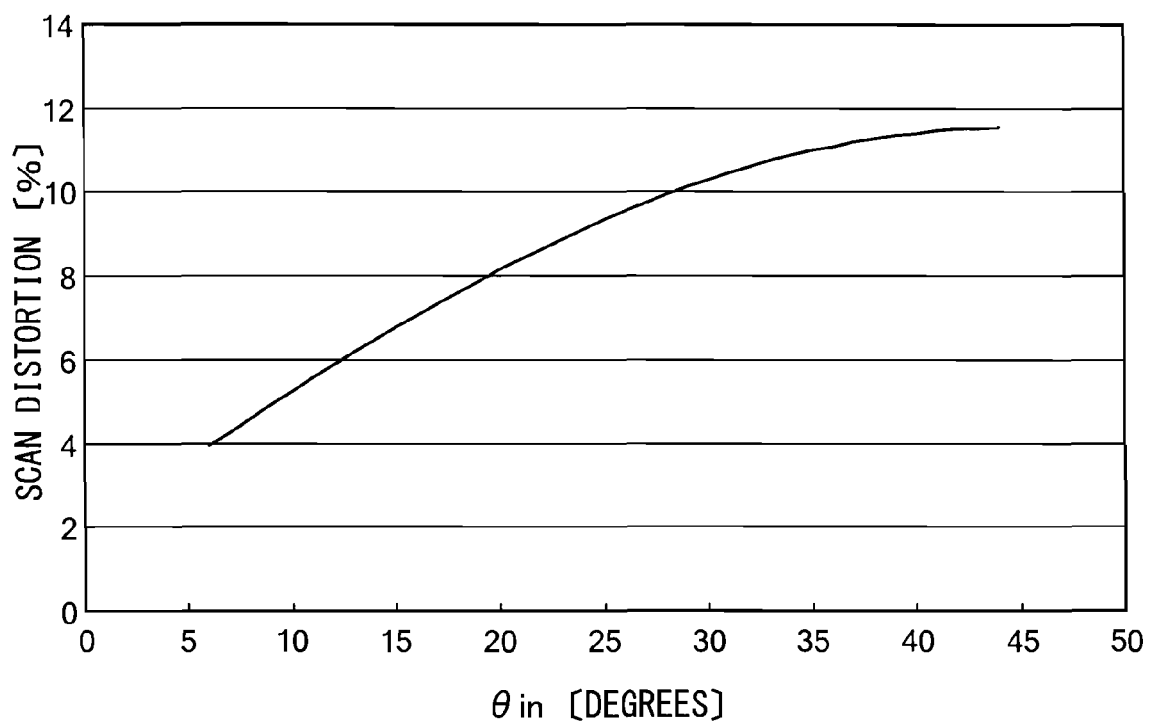
FIG. 21 is a graph showing the relationship between θin and scan distortion.
Figure 22:
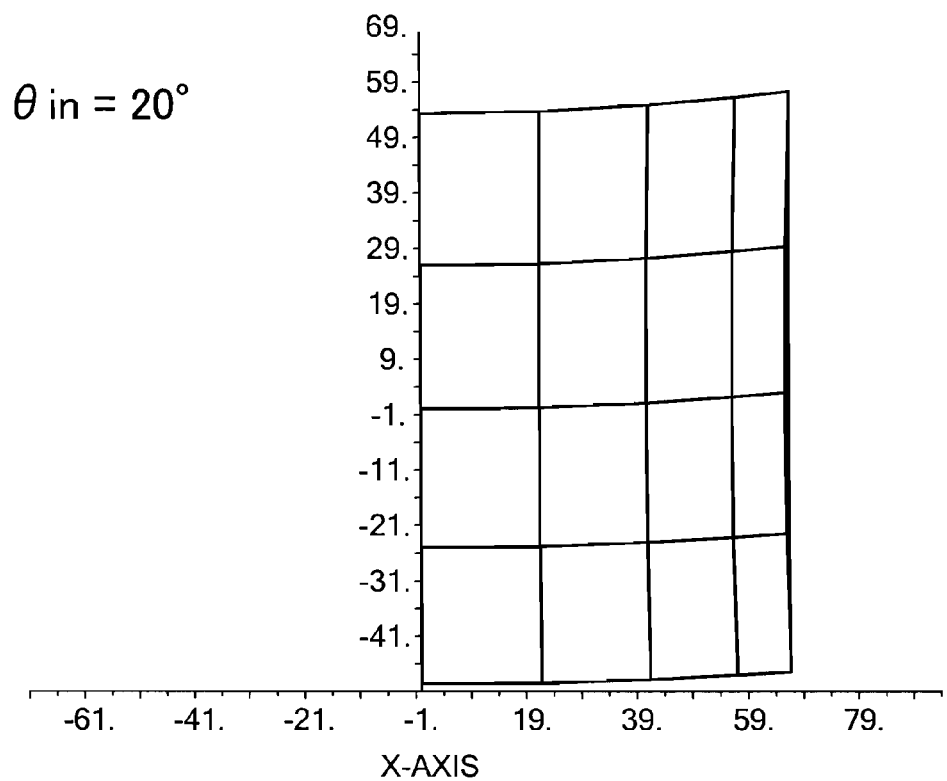
FIG. 22 is a distortion diagram showing a projected image area when θin is equal to 20° and trapezoidal distortion is minimum.
Figure 23:
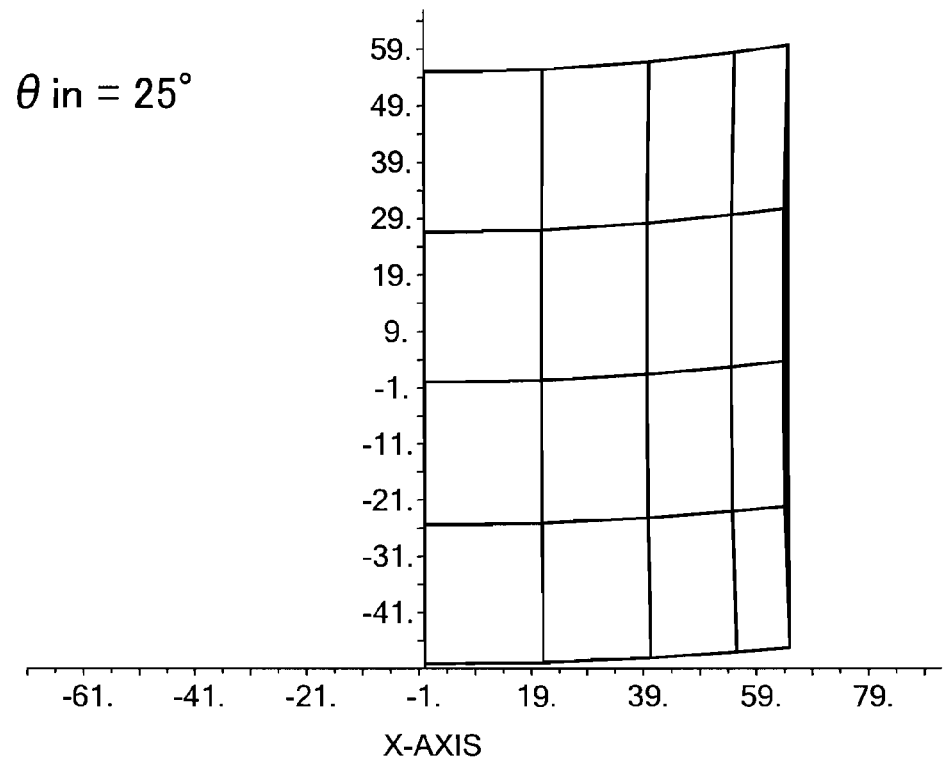
FIG. 23 is a distortion diagram showing a projected image area when θin is equal to 25° and trapezoidal distortion is minimum.
Figure 24:
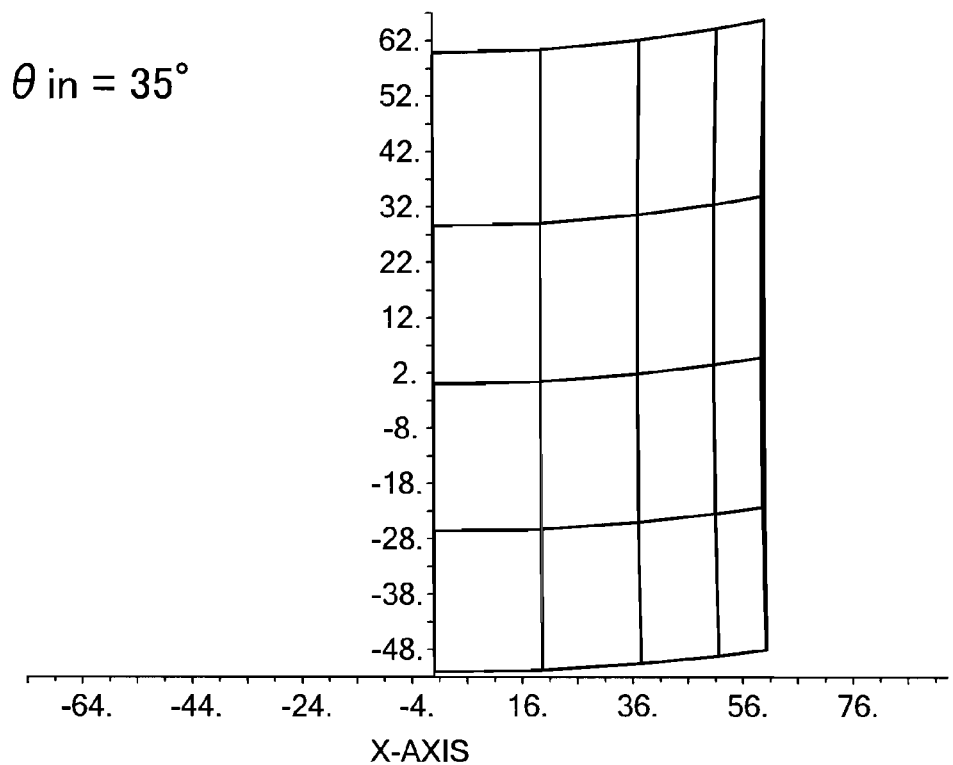
FIG. 24 is a distortion diagram showing a projected image area when θin is equal to 35° and trapezoidal distortion is minimum.
Figure 25:
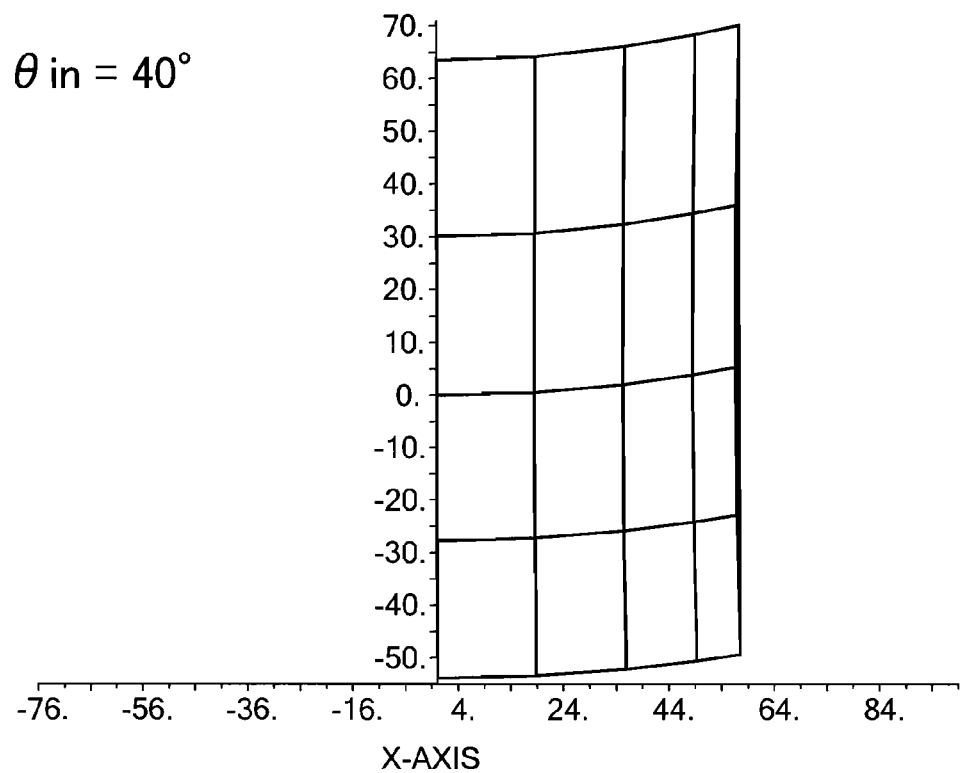
FIG. 25 is a distortion diagram showing a projected image area when θin is equal to 40° and trapezoidal distortion is minimum.

When the screen SC is two-dimensionally scanned by the deflection apparatus 3, there arises a bulge-shaped distortion, that is, a scan distortion in which one line in the H direction curves on the screen SC. The larger the angle of the oblique projection is, the notable this scanning distortion is; that is, this scan distortion is more notable at an upper part of the screen. FIG. 21, which is a graph showing the relationship between θin and the scan distortion, shows that the degree of scan distortion increases with θin. Incidentally, in FIG. 21, scan distortion is calculated by using the following expression, where the length of the projected image area in the V direction passing through the screen center in FIG. 14 is A (unit: mm) and the distance in the V direction between the top of the projected image area along the length thereof passing through the screen center and the top-right (or the top-left) corner of the screen is a (unit: mm)

$$\text{Scan Distortion}(\%) = (a/A) \times 100$$

Here, FIGS. 22 to 25 are distortion diagrams showing projected image areas when trapezoid distortion is minimum and θin is 20°, 25°, 35°, and 40°, respectively. Incidentally, although these figures each only show the distortion in the right half of the projected image area, the distortion is symmetrical over the whole projected image area. The abscissa axis (the X-axis) corresponds to the H direction, and the ordinate axis corresponds to the V direction. From these figures, it can be said that the scan distortion is small when θin is 20°, 25°, or 35°, but that the scan distortion is too large to obtain a preferable projected image when θin is 40°.

From the description hereinabove, it can be said that it is advisable that the laser projectors PJ of Embodiments 1 to 4 fulfill the following conditional expression (3). Fulfilling the conditional expression (3) makes it possible to prevent scan distortion from notably occurring in the projected image area.

$$\theta in \leq 35° \quad (3)$$

Thus, the conditional expression with respect to θin can also be expressed as follows by combining the conditional expressions (2), (2a) and (3).

$$1.5 \times \theta scan(V) < \theta in \leq 35°$$

$$2 \times \theta scan(V) < \theta in \leq 35°$$

7. Aspect Ratio (Width/Length Ratio) of Projected Image Area

It is advisable that the laser projectors PJ of Embodiments 1 to 4 fulfill the following conditional expression (4):

$$1.1 < \cos(\theta in) \times \theta scan(H)/\theta scan(V) < 1.5 \quad (4)$$

The reason is as follows.

Figure 26:
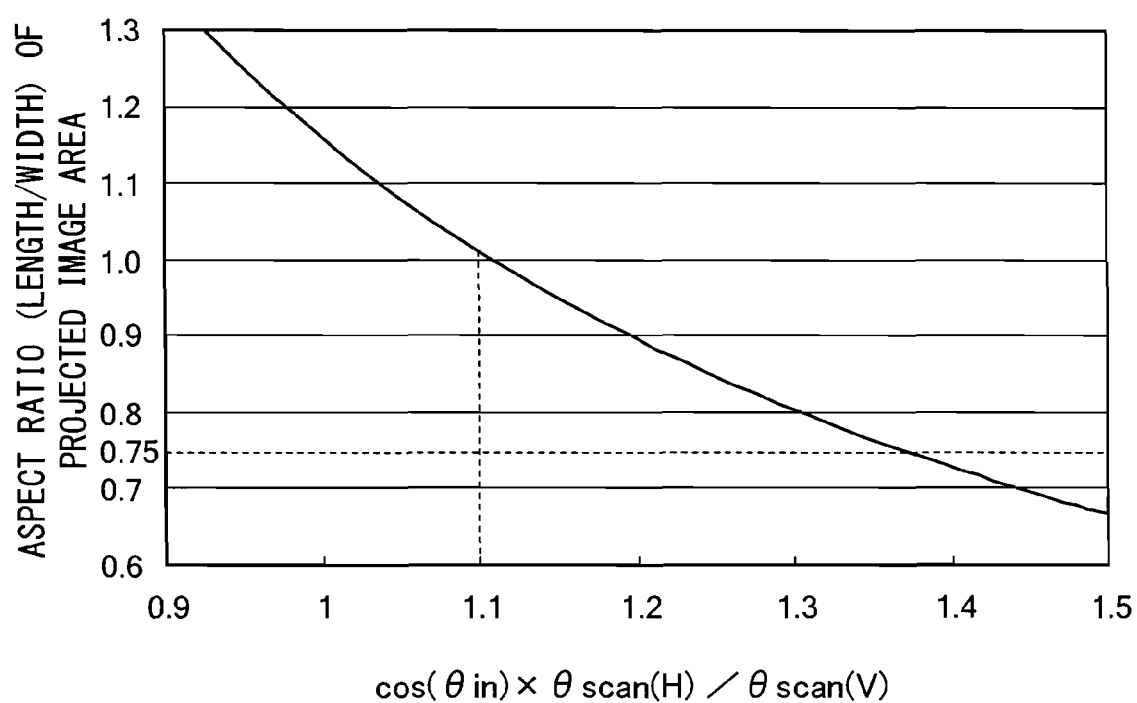
FIG. 26 is a graph showing the relationship between the value of cos(θin)×θscan(H)/θscan(V) and the aspect ratio of a projected image area.
Figure 27:
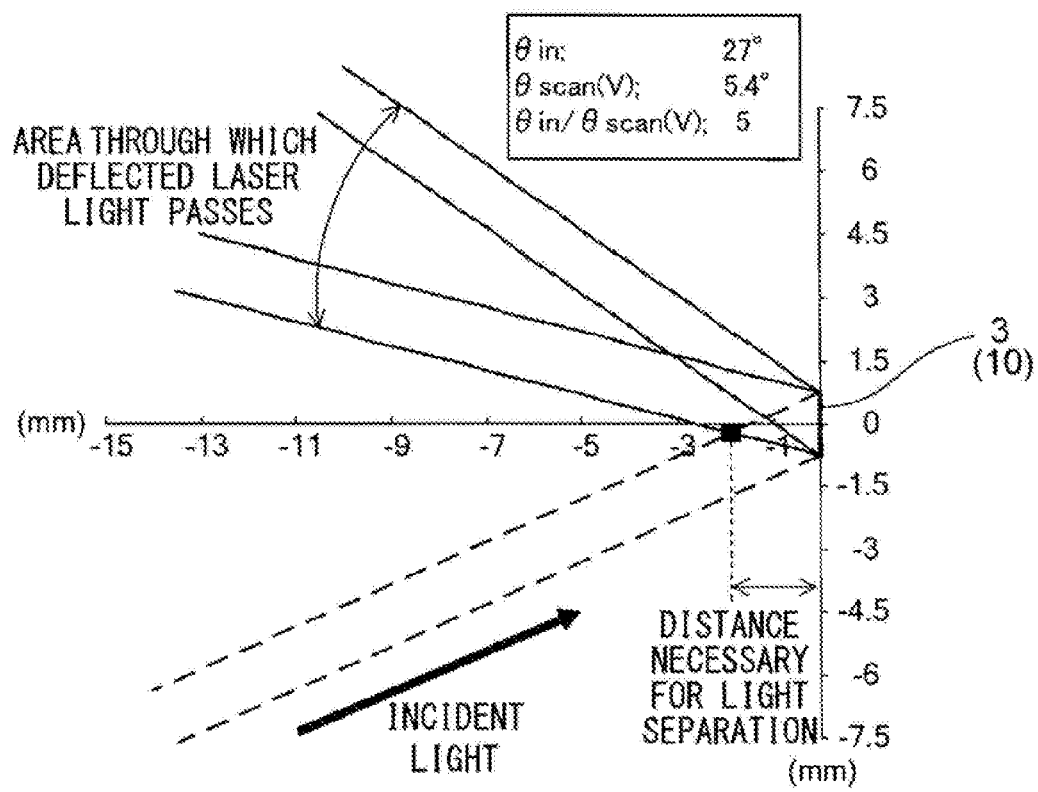
FIG. 27 is an explanatory diagram schematically showing optical paths of light incident on/reflected from the mirror of the deflection apparatus in the laser projector of Example 1.
Figure 28:
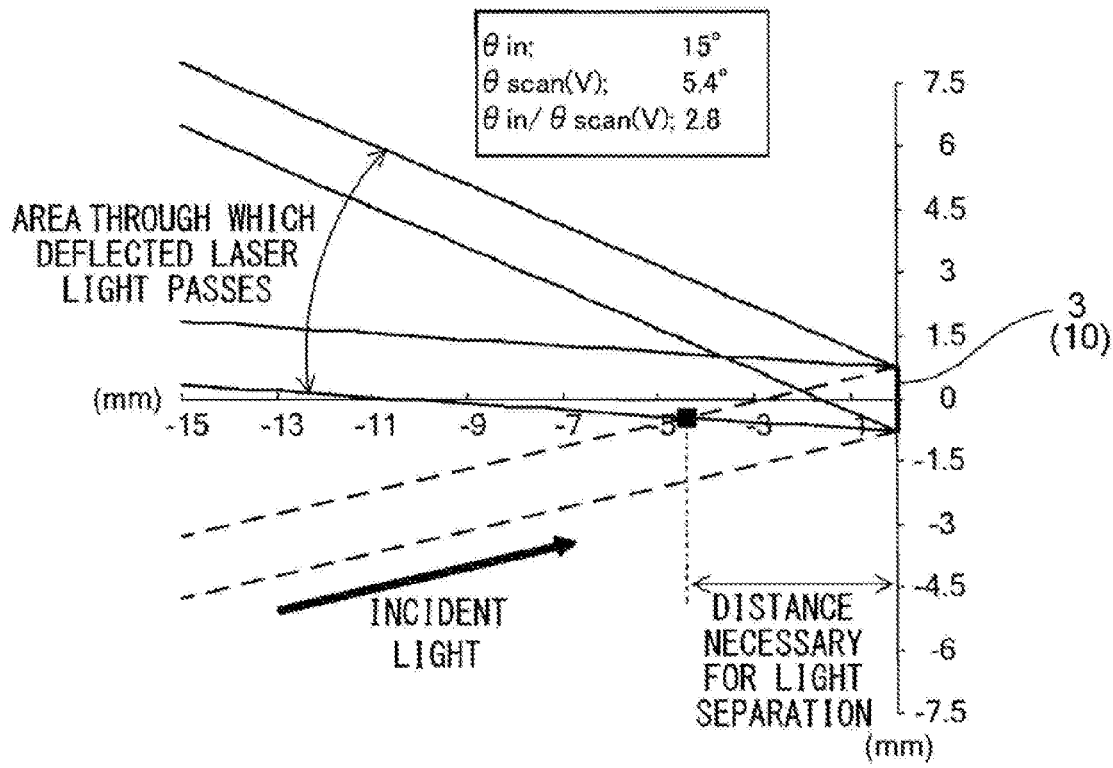
FIG. 28 is an explanatory diagram schematically showing optical paths of light incident on/reflected from the mirror of the deflection apparatus in the laser projector of Example 2.
Figure 29:
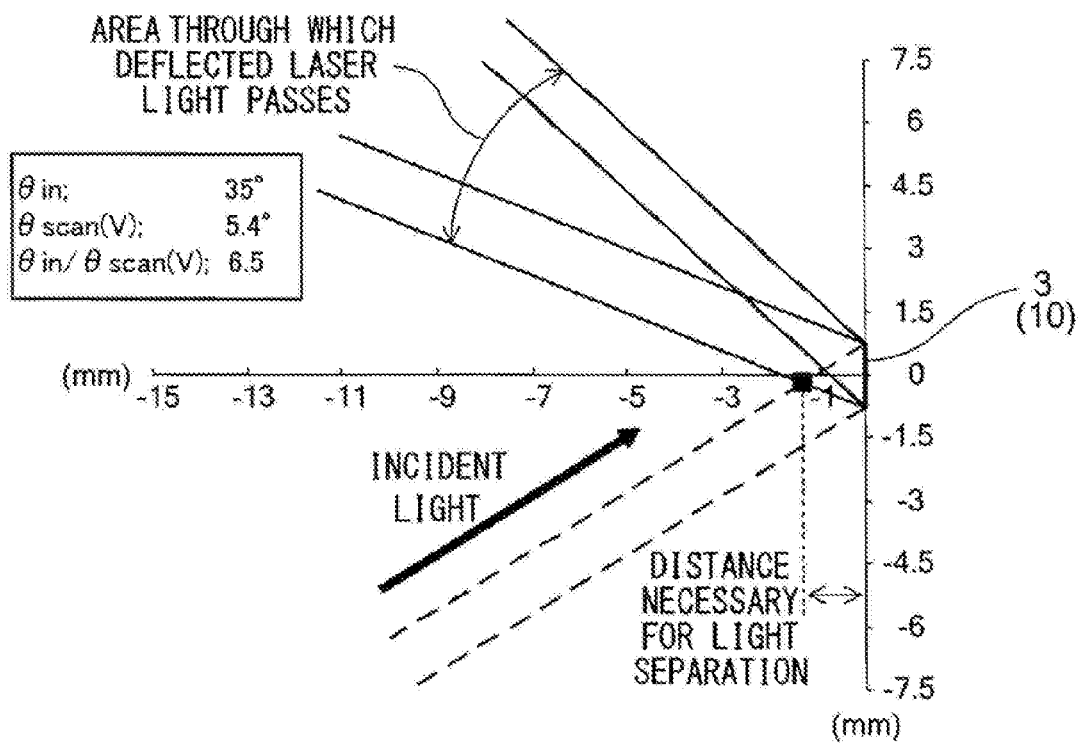
FIG. 29 is an explanatory diagram schematically showing optical paths of light incident on/reflected from the mirror of the deflection apparatus in the laser projector of Example 3.
Figure 30:
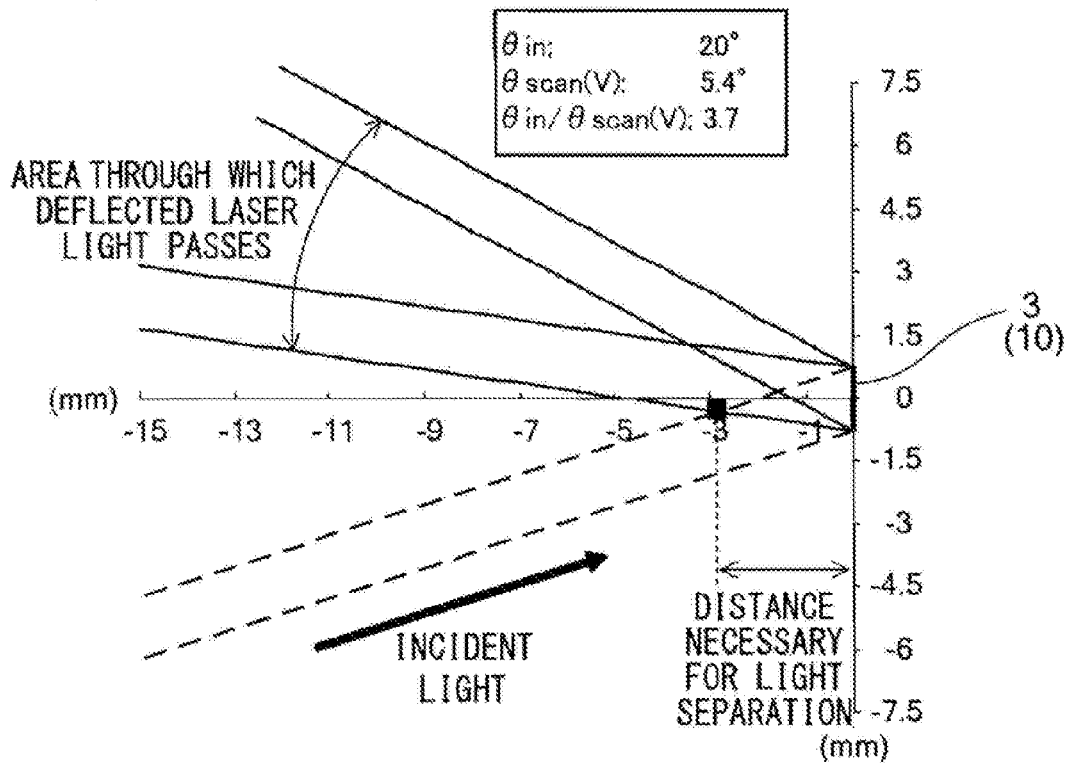
FIG. 30 is an explanatory diagram schematically showing optical paths of light incident on/reflected from the mirror of the deflection apparatus in the laser projector of Example 4.

FIG. 26 is a graph showing the relationship between the value of cos(θin)×θscan(H)/θscan(V) and the aspect ratio of the projected image area. From the figure, when the value of cos(θin)×θscan(H)/θscan(V) is smaller than 1.1, the projected image area is longer than is wide. In this case, upper and lower portions of the projected image area are cut off to project a normal, horizontally-long image (for example, length:width=3:4). Thus, it is impossible to make effective use of the entire projected image area. On the other hand, when the value of cos(θin)×θscan(H)/θscan(V) is larger than 1.5, the projected image area is excessively wider than is long, and even in a case of projecting a normal, laterally-long image, right and left end portions of the projected image area are cut off, and thus it is impossible to make effective use of the entire projected image area. Thus, fulfilling the conditional expression (4) makes it possible to achieve a preferable aspect ratio of the projected image area, and thus to make effective use of the entire projected image area. In particular, since the normal aspect ratio (3/4 (=0.75)) of a laterally-long image is within the range (0.65-1.0) corresponding to the upper and lower limits of the conditional expression (4), effective use of the entire projected image area can also be made even in a case of projecting a normal, laterally-long image.

8. Embodiments

Next, Examples 1 to 4 will be described more concretely as examples of the laser projectors PJ of the Embodiments 1 to 4, with reference to construction data and the like. Incidentally, Examples 1 to 4 are numerical examples corresponding to Embodiments 1 to 4, respectively, and the optical construction diagrams (FIGS. 1 to 8) illustrating Embodiments 1 to 4 are applicable to Examples 1 to 4, as they are.

Incidentally, in the construction data given below, Si (i=1, 2, 3 . . . ) indicates an "i"th surface from the light incidence surface of a light-collecting lens of the incidence optical system 2 as a reference surface (S1) toward the screen SC side. The location of each of the surfaces Si is identified by surface data such as lens surface top coordinates (x, y, z) and a rotation angle α (X rotation tilt), and in addition, a rotation angle β (Y rotation tilt), if necessary. The surface top coordinates of each of the surfaces Si are represented, with its surface top coordinates as the origin of a local orthogonal coordinate system (X, Y, Z), by coordinates (x, y, z) (unit: mm) of the origin of the local orthogonal coordinate system (X, Y, Z) in a global orthogonal coordinate system (x, y, z). The tilt of each of the surfaces Si is represented by the rotation angle around the X-axis and the rotation angle around the Y-axis, with its surface top as the center.

Incidentally, it is assumed that the counter clockwise direction when viewed toward the direction of travel on the X-axis (that is, when viewed from the negative direction side to the positive direction side of the X-axis) is the positive direction of the angle of rotation around the X-axis. It also is assumed that the clockwise direction when viewed toward the direction of travel on the Y-axis (that is, when viewed from the negative side to the positive side of the Y-axis) is the positive direction of the angle of rotation around the Y-axis. Note that the coordinate systems are all defined as a right-handed coordinate system, and that the global orthogonal coordinate system (x, y, z) is an absolute coordinate system that is identical to the local orthogonal coordinate system (X, Y, Z) of the reference surface (S1).

Incidentally, "R" indicates the radius of curvature (unit: mm), and "Nd" and "vd" indicate the index of refraction and the Abbe's number, respectively, with respect to a "d" line. Also, in all of Examples 1 to 4, it is assumed that the deflection apparatus 3 is sinusoidally-driven in the H direction, and linearly-driven in the V direction. Note that 75% of the scan time of one cycle is used for the H direction, and 90% of the scan time of one cycle is used for the V direction. Also, in the data of Examples 1 to 4, decentering data of the deflection apparatus 3 indicates a value of a case in which the deflection angle of the deflection apparatus 3 is 0° with respect to the H direction and the V direction.

Example 1

<Decentering Data>

| Surface No. | Surface | x | y | z | α |
|---|---|---|---|---|---|
| S1 | light incidence surface of incidence optical system (reference surface) | 0 | 0 | 0 | 0 |
| S2 | light emission surface of incidence optical system | 0 | 0 | 0.5 | 0 |
| S3 | deflection apparatus (reflection surface (also as an aperture stop)) | 0 | 0 | 20 | −27 |
| S4 | screen surface | 0 | 208.4115 | −131.42 | −40.0381 |

<Optical Component Data>

| Surface No | R | Nd | vd |
|---|---|---|---|
| S1 | 147.8855 | 1.5168 | 65.26 |
| S2 | ∞ | | |

Example 2

<Decentering Data>

| Surface No. | Surface | x | y | z | α |
|---|---|---|---|---|---|
| S1 | light incidence surface of incidence optical system (reference surface) | 0 | 0 | 0 | 0 |
| S2 | light emission surface of incidence optical system | 0 | 0 | 0.5 | 0 |
| S3 | deflection apparatus (reflection surface (also as an aperture stop)) | 0 | 0 | 20 | −15 |
| S4 | screen surface | 0 | 128.8792 | −203.225 | −15.9067 |

<Optical Component Data>

| Surface No | R | Nd | vd |
|---|---|---|---|
| S1 | 148.2363 | 1.5168 | 65.26 |
| S2 | ∞ | | |

Example 3

<Decentering Data>

| Surface No. | Surface | x | y | z | α |
|---|---|---|---|---|---|
| S1 | light incidence surface of incidence optical system (reference surface) | 0 | 0 | 0 | 0 |

-continued

| | | | | | |
|---|---|---|---|---|---|
| S2 | light emission surface of incidence optical system | 0 | 0 | 0.5 | 0 |
| S3 | deflection apparatus (reflection surface (also as an aperture stop)) | 0 | 0 | 20 | −35 |
| S4 | screen surface | 0 | 240.5985 | −67.5707 | −57.53 |

<Optical Component Data>

| Surface No | R | Nd | νd |
|---|---|---|---|
| S1 | 146.6421 | 1.5168 | 65.26 |
| S2 | ∞ | | |

Example 4

<Decentering Data (optical path not bent)>

| Surface No. | Surface | x | y | z | α |
|---|---|---|---|---|---|
| S1 | light incidence surface of incidence optical system (reference surface) | 0 | 0 | 0 | 0 |
| S2 | light emission surface of incidence optical system | 0 | 0 | 0.5 | 0 |
| S3 | deflection apparatus (reflection surface (also as an aperture stop)) | 0 | 0 | 20 | −20 |
| S4 | screen surface | 0 | 164.7346 | −1176.32 | −27.29 |

<Optical Component Data>

| Surface No | R | Nd | νd |
|---|---|---|---|
| S1 | 147.2438 | 1.5168 | 65.26 |
| S2 | ∞ | | |

<Decentering Data (optical path bent)>

| Surface No. | Surface | x | y | z | α | β |
|---|---|---|---|---|---|---|
| S1 | light incidence surface of incidence optical system (reference surface) | 0 | 0 | 0 | 0 | |
| S2 | light emission surface of incidence optical system | 0 | 0 | 0.5 | 0 | |
| S3 | twisting upward-reflection mirror (reflection mirror) | 0 | 0 | 5.0703 | −43.1167 | −14.3759 |
| S4 | downward-reflection mirror (reflection surface) | −3 | 8 | 5.0703 | −90 | −65.278 |
| S5 | deflection apparatus (also as an aperture stop) | 3 | 10.1838 | 5.0703 | 0 | −90 |
| S6 | screen surface | −243.4253 | 99.8753 | 5.0703 | −90 | −82.7117 |

<Optical Component Data>

| Surface No. | R | Nd | νd |
|---|---|---|---|
| S1 | 147.2438 | 1.5168 | 65.26 |
| S2 | ∞ | | |

FIGS. 27 to 30 are explanatory diagrams schematically showing optical paths of light incident on/reflected from the mirror 10 of the deflection apparatus 3 in Examples 1 to 4, respectively. Incidentally, in each of the figures, the vertical axis of the figure indicates the length (unit: mm) of the mirror 10 of the deflection apparatus 3 in the V direction, and the horizontal axis indicates the distance (unit: mm) necessary for light separation. The value of θscan(V) is 5.4° in all of Examples 1 to 4, but Examples 1 to 4 are different from each other in the value of θin. Specific values of θin in Examples 1 to 4 are shown in FIGS. 27 to 30 and in Table 2 which will be described later. Furthermore, in these figures, the area through which deflected laser light passes indicates an area through which deflected laser light resulting from the mirror 10 deflecting laser light within the range of θscan(V)=±5.4° passes.

When the length of the mirror 10 in the V direction that is denoted by L1 is 1.5 (unit: mm), and the distance necessary for light separation is denoted by L2 (unit: mm), specific values of L2 and the values of L2/L1 of Examples 1 to 4 are shown in Table 1. Table 1 shows that the values of L2/L1 of Examples 1 to 4 are all surely smaller than the value (L2/

L1=8) mentioned above with respect to the case where consideration is given to the provision of the reflection mirror, and that a thinner device is surely achieved in each of Examples 1 to 4.

TABLE 1

|  | Example 1 | Example 2 | Example 3 | Example 4 |
|---|---|---|---|---|
| MEME length in V direction (mm); L1 | 1.5 | 1.5 | 1.5 | 1.5 |
| length necessary for light separation (mm); L2 | 1.87 | 4.39 | 1.3 | 2.85 |
| L2/L1 | 1.2 | 2.9 | 0.9 | 1.9 |

Table 2 shows values of parameters (including conditional expressions) of Examples 1 to 4. Table 2 shows that the laser projectors PJ of Examples 1 to 4 satisfy all of the above-described conditional expressions. Incidentally, $\theta\text{scan(H)\_all}$ and $\theta\text{scan(V)\_all}$ in Table 2 each indicates a largest value (absolute value) of the mechanical scanning angle of the mirror 10 of the deflection apparatus 3. That is, in an actual projection, angles equal to or smaller than the largest values are used as $\theta\text{scan(H)}$ and $\theta\text{scan(V)}$.

TABLE 2

|  | Example 1 | Example 2 | Example 3 | Example 4 |
|---|---|---|---|---|
| Θin (°) | 27 | 15 | 35 | 20 |
| Θmems (°) | 13.0381 | 0.91 | 22.53 | 7.29 |
| Θscan(H)_all (°) | 8 | 8 | 8 | 8 |
| Θscan(V)_all (°) | 6 | 6 | 6 | 6 |
| Θscan (H) (°) | 7.4 | 7.4 | 7.4 | 7.4 |
| Θscan(V) (°) | 5.4 | 5.4 | 5.4 | 5.4 |
| Θmems/Θin | 0.482893 | 0.60667 | 0.643714 | 0.3645 |
| Θin/Θscan(V) | 5 | 2.777778 | 6.481481 | 3.703704 |
| cos(Θin) × Θscan (H)/Θscan(V) | 1.221009 | 1.323676 | 1.122542 | 1.287727 |
| trapezoidal distortion (%) | 0 | 5 | −5 | 2 |

Incidentally, although, in the above description, it is assumed that the laser projector PJ is placed on a desk so as for laser light to be projected to the screen SC from below, the advantages of the present invention can also be obtained when laser light is projected toward the screen SC from above by fixing the laser projector PJ on the ceiling.

INDUSTRIAL APPLICABILITY

The present invention is applicable to a laser projector that displays a two-dimensional image on a projection surface by two-dimensionally scanning the projection surface with laser light.

| List of Reference Symbols | |
|---|---|
| 1 | laser light source |
| 3 | deflection apparatus |
| 4 | upward-reflection mirror |
| 5 | downward-reflection mirror |
| 10 | mirror (reflection member) |
| 51 | piezoelectric element |
| 52 | piezoelectric element |
| 53 | piezoelectric element |
| 54 | piezoelectric element |
| SC | screen (projection surface) |

The invention claimed is:

1. A laser projector, comprising:
a laser light source; and
a deflection apparatus that deflects light from the laser light source by a reflection member in a first scanning direction and a second scanning direction that are orthogonal to each other, and that scans a projection surface two-dimensionally,
the laser projector displaying a two-dimensional image on the projection surface by adjusting an output of the laser light source according to a deflection state of the deflection apparatus,
wherein the deflection apparatus scans faster in a first scanning direction than in a second scanning direction,
wherein the deflection apparatus deflects light from the laser light source to thereby project light onto the projection surface obliquely in the second scanning direction,
wherein, assuming that a screen-center display state of the deflection apparatus is a deflection state in which a ray from the laser light source is deflected by the deflection apparatus to be incident on a center of the projection surface, and that a positive direction in the second scanning direction is a direction in which an incidence angle of a ray deflected by the deflection apparatus on the projection surface increases,
light from the laser light source is incident on the deflection apparatus from a negative direction side in the second scanning direction, and
a normal line of the reflection member of the deflection apparatus in the screen-center display state is tilted toward the negative direction side in the second scanning direction with respect to a normal line of the projection surface.

2. The laser projector of claim 1, wherein the second scanning direction is a vertical direction.

3. The laser projector of claim 1, wherein a conditional expression (1) is fulfilled:

$$0.25 < \theta\text{mems}/\theta\text{in} < 0.75 \qquad (1)$$

where
θmems is an angle formed by the normal line of the reflection member of the deflection apparatus in the screen-center display state and a normal line of the projection surface in the second scanning direction; and
θin is an incidence angle in the second scanning direction when a principal ray from the laser light source is incident on the reflection member of the deflection apparatus in the screen-center display state.

4. The laser projector of claim 3, wherein a conditional expression (1a) is further fulfilled:

$$0.3 < \theta\text{mems}/\theta\text{in} < 0.7 \qquad (1a).$$

5. The laser projector of claim 1, wherein a projection direction of light from the laser light source is orthogonal to the normal line of the reflection member of the deflection apparatus in the screen-center display state,
the laser projector further including: an upward-reflection mirror reflecting light from the laser light source upward in a twisting direction; and a downward-reflection mirror reflecting light reflected upward by the upward-reflection mirror downward to the deflection apparatus.

6. The laser projector of claim 1,
wherein the deflection apparatus is driven by a piezoelectric driving method in which a voltage is applied to a piezoelectric element to rotate the reflection member to thereby deflect light from the laser light source that is incident on the reflection member.

7. The laser projector of claim 1, wherein a conditional expression (2) is fulfilled:

$$\theta\text{in}/\theta\text{scan}(V) > 1.5 \qquad (2)$$

where $\theta\text{in}$ is an incidence angle in the second scanning direction when the principal ray from the laser light source is incident on the reflection member of the deflection apparatus in the screen-center display state; and $\theta\text{scan}(V)$ is a mechanical scanning angle in the second scanning direction from the screen-center display state of the deflection apparatus.

8. The laser projector of claim 7, wherein a conditional expression (2a) is further satisfied:

$$\theta\text{in}/\theta\text{scan}(V) > 2 \tag{2a}$$

9. The laser projector of claim 7, wherein a conditional expression (3) is fulfilled:

$$\theta\text{in} \leqq 35° \tag{3}$$

10. The laser projector of claim 1, wherein a conditional expression (4) is fulfilled:

$$1.1 < \cos(\theta\text{in}) \times \theta\text{scan}(H)/\theta\text{scan}(V) < 1.5 \tag{4}$$

where $\theta\text{in}$ is an incidence angle in the second scanning direction when the principal ray from the laser light source is incident on the reflection member of the deflection apparatus in the screen-center display state;

$\theta\text{scan}(H)$ is a mechanical scanning angle in the first scanning direction from the screen-center display state of the deflection apparatus; and $\theta\text{scan}(V)$ is a mechanical scanning angle in the second scanning direction from the screen-center display state of the deflection apparatus.

* * * * *